US006038508A

United States Patent [19]

Maekawa et al.

[11] Patent Number: 6,038,508

[45] Date of Patent: *Mar. 14, 2000

[54] VEHICULAR NAVIGATION SYSTEM AND MEMORY MEDIUM

[75] Inventors: Kazuteru Maekawa; Hitoshi Asano; Kyomi Morimoto; Takeshi Yanagikubo, all of Anjo, Japan

[73] Assignee: Aisin AW Co., Ltd., Anjo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/885,727

[22] Filed: Jun. 30, 1997

[30] Foreign Application Priority Data

Jul. 31, 1996 [JP] Japan .................................... 8-201981

[51] Int. Cl.[7] .............................. G06G 7/78; G01C 21/00

[52] U.S. Cl. ........................... 701/207; 701/208; 701/209

[58] Field of Search .................................... 701/201, 202, 701/207, 208, 209, 23, 211, 213; 340/988, 990, 995; 345/156, 353, 173, 333, 357; 73/178 R

[56] References Cited

U.S. PATENT DOCUMENTS

| | | | |
|---|---|---|---|
| 4,951,211 | 8/1990 | De Villeroche | 701/202 |
| 5,177,685 | 1/1993 | Davis et al. | 701/209 |
| 5,191,532 | 3/1993 | Moroto et al. | 701/201 |
| 5,765,123 | 6/1998 | Nimura et al. | 701/208 |
| 5,784,059 | 7/1998 | Morimoto et al. | 701/208 |
| 5,802,492 | 9/1998 | DeLorme et al. | 701/208 |
| 5,819,200 | 10/1998 | Tamai et al. | 701/208 |
| 5,825,306 | 10/1998 | Hiyokawa et al. | 701/209 |
| 5,832,408 | 11/1998 | Tamai et al. | 701/208 |

*Primary Examiner*—Jacques H. Louis-Jacques
*Attorney, Agent, or Firm*—Oliff & Berridge, PLC

[57] ABSTRACT

A vehicular navigation system which is enabled by inputting the name of a registered point to search for the corresponding registered point, including an information memory for storing, as registered point data, registered point name data and the district data where the registered point is located; an input device or devices for inputting a portion or the entire registered point name and district designation data for the registered point to be searched; a search engine for searching for the registered point that corresponds to a portion or the entire name input via the input device or devices, from the registered points which are stored in the information memory; and a display for displaying the searched registered points in a list, wherein the search engine searches for the registered point corresponding to the input district input by the input device or devices.

14 Claims, 20 Drawing Sheets

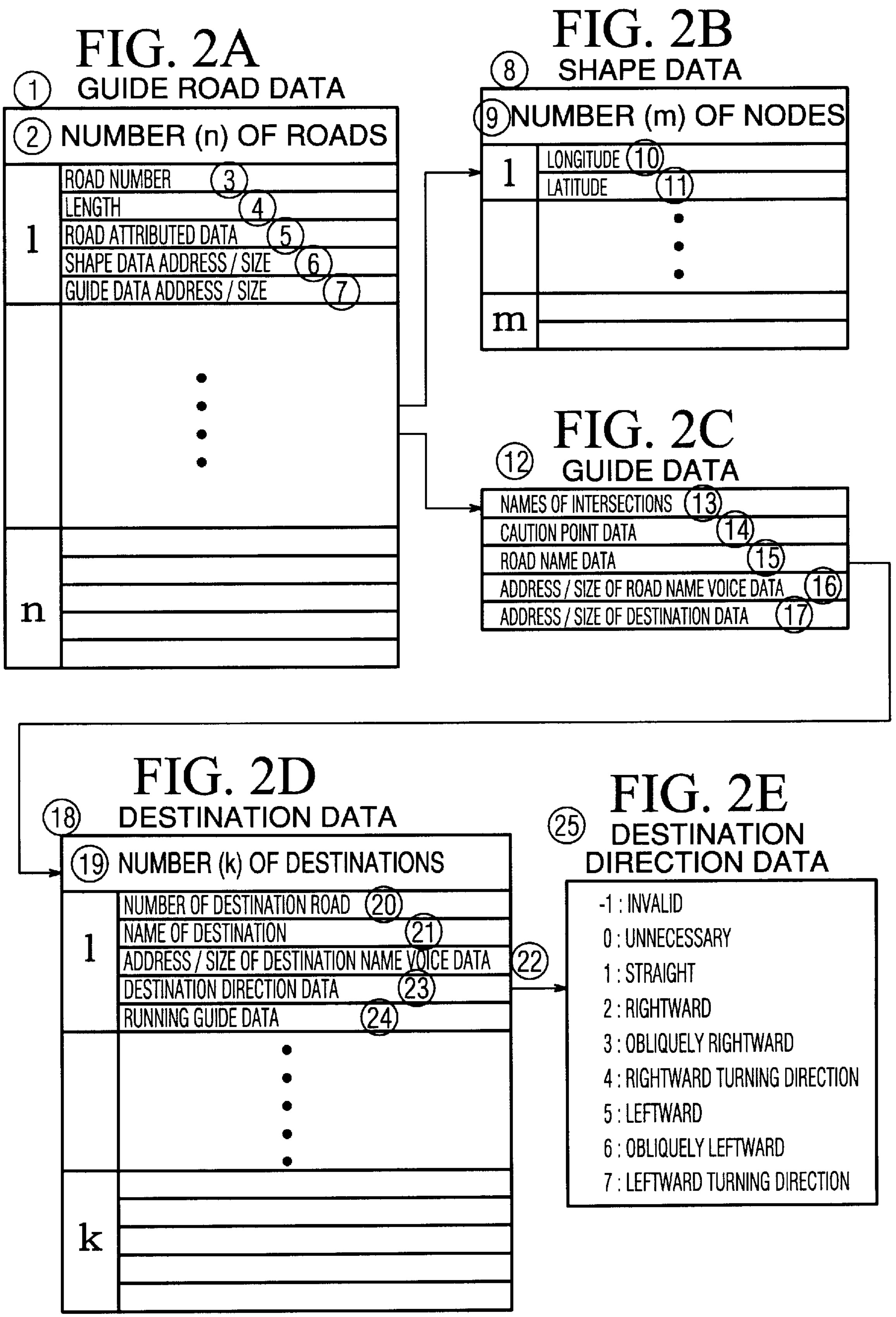
FIG. 2A
1 GUIDE ROAD DATA
2 NUMBER (n) OF ROADS
1
ROAD NUMBER 3
LENGTH 4
ROAD ATTRIBUTED DATA 5
SHAPE DATA ADDRESS / SIZE 6
GUIDE DATA ADDRESS / SIZE 7
n
FIG. 2B
8 SHAPE DATA
9 NUMBER (m) OF NODES
1
LONGITUDE 10
LATITUDE 11
m
FIG. 2C
12 GUIDE DATA
NAMES OF INTERSECTIONS 13
CAUTION POINT DATA 14
ROAD NAME DATA 15
ADDRESS / SIZE OF ROAD NAME VOICE DATA 16
ADDRESS / SIZE OF DESTINATION DATA 17
FIG. 2D
18 DESTINATION DATA
19 NUMBER (k) OF DESTINATIONS
1
NUMBER OF DESTINATION ROAD 20
NAME OF DESTINATION 21
ADDRESS / SIZE OF DESTINATION NAME VOICE DATA 22
DESTINATION DIRECTION DATA 23
RUNNING GUIDE DATA 24
k
FIG. 2E
25 DESTINATION DIRECTION DATA
-1 : INVALID
0 : UNNECESSARY
1 : STRAIGHT
2 : RIGHTWARD
3 : OBLIQUELY RIGHTWARD
4 : RIGHTWARD TURNING DIRECTION
5 : LEFTWARD
6 : OBLIQUELY LEFTWARD
7 : LEFTWARD TURNING DIRECTION

㉜ INDIVIDUAL CDs STOCKED WITH DATA OF COVERED DISTRICTS

No.1　No.2　No.3　No.4　No.5　No.6

㉝ NUMBER (n) OF REGISTERED POINTS

| 1 | ㉞ AICHI PREFECTURE (m) | | | |
|---|---|---|---|---|
| | 1 | ㉟ ANJO CITY (l) | | |
| | | 1 | ㊱ AIOI CHO (k) | |
| | | | 1 | ㊲ COORDINATES OF REGISTERED POINT |
| | | | | ㊳ REGISTERED POINT NAME DATA |
| | | | | ㊴ FACING ROAD NUMBER |
| | | | ⋮ | ⋮ |
| | | | k | |
| | | ⋮ | ⋮ | |
| | | l | | |
| | ⋮ | ⋮ | | |
| | m | | | |
| ⋮ | ⋮ | | | |
| n | | | | |

| SET DESTINATION | RETURN |

PLEASE TOUCH ▭

| TEL. NO. | ADDRESS | 50 KANA |

NAMES OF FACILITIES
| GOLF COURSE | PLAY GROUND | ANOTHER FACILITY |

REGISTERED POINT
| HOME | MEMORY POINT | PREVIOUS STARTING POINT |

50 KANA

| 50 KANA | RETURN |

PLEASE INPUT NAME RENDERING (40)

SELECT PREFECTURE

SELECT PREFECTURE

| 50 KANA | SELECT DATA OF AICHI PREFECTURE |

| FUJI | | CORRECT |

| SELECT CITY / TOWN / VILLAGE | 1950 ITEMS | LIST |

LIST

⬇

| 50 KANA | RETURN |

PLEASE TOUCH ▭

- BACK-WARD
- PAGE
- PAGE
- FOR-WARD

- ㊿ FUJI PRINTING
- �51 FUJI WINDOW
- �52 FUJI CONTACT
- �53 FUJI COMPUTER
- �54 FUJI KOGYO

⬇

�55 DISPLAY MAP AROUND SELECTED POINT

[50 KANA] [SELECT FROM DATA OF AICHI] [RETURN]

PLEASE INPUT NAME RENDERING

SELECT CITY / TOWN / VILLAGE

⬇

[50 KANA] [SELECT FROM DATA OF AICHI] [RETURN]

JUN [CORRECT]

SELECT CITY / TOWN / VILLAGE | 2689 ITEMS | LIST

LIST

⬇

SELECT CITY / TOWN / VILLAGE    RETURN

PLEASE TOUCH ☐

BACK-WARD
50 KANA
50 KANA
FOR-WARD

㊾ ASAHI TOWN
㊼ ASUKE TOWN
㊽ ATSUMI TOWN
㊾ ANJO CITY
㊿ ICHINOMIYA CITY

ANJO CITY

⬇

50 KANA | SELECT DATA OF ANJO CITY | RETURN

JUN | CORRECT

SELECT CITY / TOWN / VILLAGE | 28 ITEMS | LIST

LIST

⬇

| 50 KANA | SELECT FROM DATA OF ANJO CITY |

JUN  |  CORRECT

SELECT CITY / TOWN / VILLAGE | 28 ITEMS | LIST

SELECT CITY / TOWN / VILLAGE

SELECT CITY / TOWN / VILLAGE | RETURN

PLEASE TOUCH

BACKWARD

�===  ATSUMI TOWN

50 KANA

㊻  ANJO CITY

㊼  ICHINOMIYA CITY

50 KANA

㊽  OKAZAKI CITY

FORWARD

㊾  KANIE TOWN

OKAZAKI CITY  ㊿

| 50 KANA | SELECT FROM DATA OF OKAZAKI CITY |

| JUN | | CORRECT |

| SELECT CITY / TOWN / VILLAGE | 35 ITEMS | LIST |

LIST

⬇

| 50 KANA | RETURN |

PLEASE TOUCH ▭

BACK-WARD

▭ JUN

PAGE

▭ JUN

▭ JUN

▭ JUN

PAGE

▭ JUN

FOR-WARD

⬇

DISPLAY MAP AROUND SELECTED POINT

FIG. 20

| RENDERING | NAME | POSITION / INFORMATION |
|---|---|---|
| • | | |
| • | | |
| • | | |
| • | | |
| • | | |
| (t) KOKUGIKAN RYOGOKU | (x) RYOGOKU KOKUGIKAN | |
| • | | |
| (u) DISNEY LAND TOKYO | (y) TOKYO DISNEY LAND | |
| • | | |
| (v) TOKYO DISNEY LAND | (z) TOKYO DISNEY LAND | |
| • | | |
| (w) RYOGOKU KOKUGIKAN | (A) RYOGOKU KOKUGIKAN | |
| • | | |
| | | |

VEHICULAR NAVIGATION SYSTEM AND MEMORY MEDIUM

The entire disclosure of Japanese Patent Application No. 8-201981 filed on Jul. 31, 1996 including specification, drawings, and abstract is incorporated herein by reference in its entirety.

BACKGROUND OF THE INVENTION

1. Field of Invention

The invention relates to a vehicular navigation system for locating a registered point, such as a destination or waypoint, by inputting the name of the registered point.

2. Description of Related Art

In the navigation system of the prior art, input can be made when a point such as a destination or waypoint is to be located. Registered point data, as stored in memory, contain not only the coordinates of the points but also the names of shops or other facilities. Therefore, if the user knows the name of a desired point, he can display the desired point on the map by inputting its name. He can then set the desired point as the destination or waypoint to receive the route guidance. Moreover, the driver can locate the desired point merely by inputting a portion of the name if he does not know the complete name. In addition, the registered points corresponding to the names are displayed in a list so that they may be selected by the user.

The memory medium in the aforementioned system of the prior art has a large memory capacity such that it can store a great number of names of shops or facilities and their coordinates, as described above. However, if national information is used, a massive amount of information is extracted and displayed in the list, unless the user inputs the formal names as correctly as possible. For example, if shop names, such as those often used for coffee shops of beauty parlors, are input as a desired location, several hundreds of names which have wholly or partially identical names are extracted. Conceivably, the list could contain the addresses (in the cities, towns and villages) corresponding to the names when listed. However, even if the addresses are known to some extent, it is not easy to locate the desired point using its address from a list containing several hundred names.

SUMMARY OF THE INVENTION

The invention has been conceived to solve the above-specified problems and to provide a vehicular navigation system which makes it easier to input and search for names or character series of registered points.

According to the invention, a vehicular navigation system is provided which enables the inputting of a name of a registered point in order to search for the corresponding registered point. The system comprises information memory means for storing, registered point data, such as registered point name data and the district data where the registered point is located; input means for inputting a portion or the entire registered point and the district data where the registered point is to be searched; search means for searching for the registered point, which corresponds to a portion or the entire name input to the input means, from the registered points which are stored in the information memory means; and display means for displaying the searched registered points in a list, wherein the search means searches for the registered point corresponding to the input district (district as used herein means a defined area that may correspond to a region of a country) as input via the input means.

According to the invention, a vehicular navigation system is provided which enables the input of and search for the name of a registered point thereby to display a map containing the searched registered point, comprising information memory means for storing, as map and registered point data, the name data for each registered point, and the position coordinates of the registered point in the district in which the registered point is located; input means for inputting a portion or the name of the registered point and the district data where the registered point is to be searched; search means for searching for the registered point, which corresponds to a portion or the entire name of the input by the input means; and display means for displaying the searched registered points in a list and for displaying a map on the basis of the position coordinates of the registered point, by reading the position coordinates when one of the registered points displayed in the list is selected, wherein the search means searches for the registered point corresponding to the district data input by the input means.

According to the invention, a vehicular navigation system is provided which enables, through input of the name of a registered point, a search for the corresponding registered point thereby to provide route guidance by setting the searched registered point as a destination or waypoint, comprising information memory means for storing, as map and registered point data, name data for each registered point, and the position coordinates of the registered point in the district in which the registered point is located; input means for inputting a portion or the entire name of the registered point and the district data where the registered point is to be searched; search means for searching for the registered point, which corresponds to a portion or the entire name input by the input means; display means for displaying the searched registered points in a list; present positions detecting means for detecting the present position of the vehicle; and route guide means for guiding the route on the basis of the present position detected and the destination or waypoint position coordinates of the registered points, wherein the search means searches for the registered point corresponding to the district data input by the input means.

According to the invention, a vehicular navigation system is provided which enables, through input of the character series of the name of a registered point, a search for the corresponding registered point, comprising information memory means for storing, as registered point data, the data on the name or character series of each registered point and the district data where the registered point is located; input means for inputting a portion or the entire name or character series of the registered point and the district data where the registered point is to be searched; search means for searching for the registered point, which corresponds to a portion or the entire character series input by the input means, from the registered points which are stored in the information memory means; and display means for displaying the searched registered points in a list, wherein the search means searches for the registered point corresponding to the information for designating the district which is input by the input means.

According to the invention, a recording medium containing a program capable of searching for a registered point corresponding to a name externally input is provided. The program includes storing, as the registered point data, the name data for each registered point and the district data where the registered point is located; inputting, as an external input signal, a portion or the entire name of the registered point and the district data for searching for the registered point; searching for the registered point, which corresponds to a portion or the entire name input, and searching for the registered point in the corresponding district; and displaying the searched registered points in a list.

According to the invention, a recording medium containing a program capable of searching for a registered point corresponding to a name externally input is provided wherein the program includes storing, as registered point data, the data on the character series of the name of each registered point and the district data where the registered point is located; inputting, as an external input signal, a portion or the entire character series of the name of the registered point and the district data needed in searching for the registered point; searching for the registered point, which corresponds to a portion or the entire input name or character series, and searching for the registered point of the corresponding district; and displaying the searched registered points in a list.

BRIEF DESCRIPTION OF THE DRAWINGS

FIG. 2 is a diagram showing a road data file;

FIG. 20 is a diagram showing a name list;

DETAILED DESCRIPTION OF PREFERRED EMBODIMENTS

The description herein is in the context of a system used in Japan. However, the system is applicable to any geographic location requiring only modifications to the programming to address language and geopolitical place designations. Any skilled programmer could accomplish such changes based on the detailed description of the invention that follows.

Figure 1:
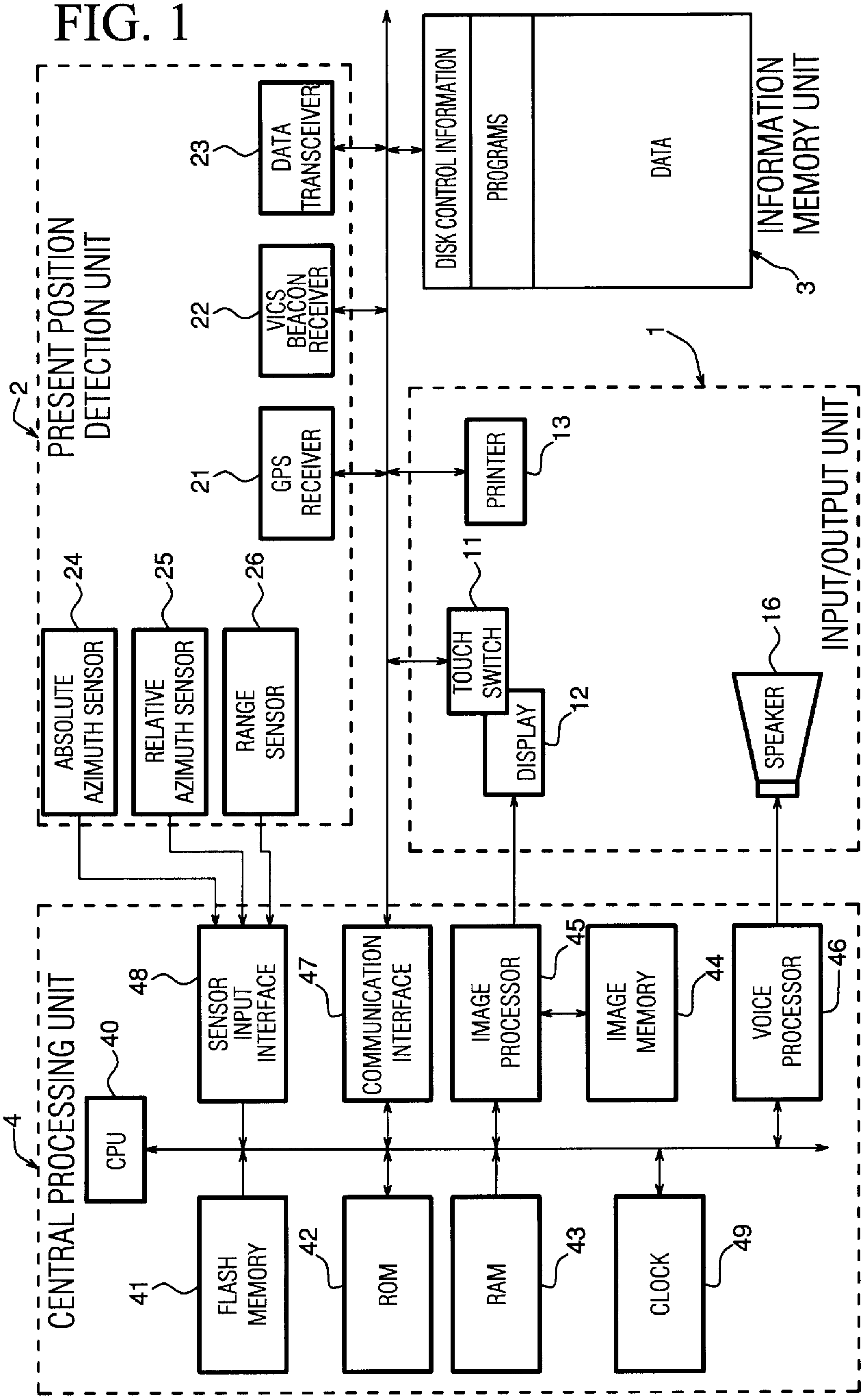
FIG. 1 is a diagram showing one embodiment of a vehicular navigation system to which the invention applies.

FIG. 1 is a diagram showing one embodiment of a vehicular navigation system to which the invention applies.

As shown in FIG. 1, the vehicular navigation system is structured to include an input/output unit 1 for inputting/outputting the information for route guidance; a present position detecting unit 2 for detecting the present position of the vehicle; an information memory unit 3 recording navigation data necessary for calculating the route, display/voice guide data necessary for the route guidance, and programs (of applications and/or operating systems); a central control unit 4 for processing the route search and the display/voice guidance necessary for route guidance and control of the entire system. These individual components will be described first.

In order to input the destination and output guidance information in voice and/or on the display on demand, the input/output unit 1 instructs the central control unit 4 to process the navigation data in accordance with the intention of the driver and to output the processed data to the printer. To realize these functions, the input portion is provided with a touch switch 11 and a control switch for requesting route guidance and for inputting the destination by an identifier, such as a telephone number or coordinates on a map. The input portion may be exemplified by an input device such as a remote control.

The output portion is provided with a display 12 for displaying input data on the screen or for automatically displaying route guidance in response to a request by the driver, a printer 13 for printing the date, and a speaker 16 for outputting route guidance by voice.

A voice recognition unit can be added for making a voice input possible and a recording card reader for reading the date recorded on an integrated circuit (IC) or magnetic card can also be provided. Further, an information center can be added for storing the data necessary for the navigation and for servicing the information through communication lines on demand. A data communicator can be added for transferring the data from an information source, such as an electronic note stored in advance, with the data intrinsic to the driver, such as map or destination data.

The display 12 is made of a color CRT or a color liquid display for outputting in color, all the screens necessary for navigation such as map data, the route setting screen, the section screen and the intersection screen, and for displaying buttons to set route guidance and to change the screen. In particular, the intersection information, such as the intersection name, is temporarily displayed in color on the section screen. However, a black and white display can be used with various ways of highlighting data of concern.

This display is mounted in the instrument panel in the vicinity of the driver's seat so that the driver is able to confirm the present position of his vehicle and to acquire the route to follow by observing the section diagram. Moreover, the display 12 is provided with touch display buttons so that the aforementioned operations are executed on the basis of the signals input by touching the buttons on the display. The input signal generating means, as composed of buttons and touch switches, comprises the input portion, the detailed description of which will be omitted.

The present position detecting unit 2 is a device for detecting or receiving the information on the present position of the vehicle and includes an absolute azimuth sensor 24 made of a geomagnetism sensor or the like; a relative azimuth sensor 25 made of a steering sensor, a gyro, etc.; a range sensor 26 for detecting the covered range from the RPM of the wheels; a GPS receiver 21 making use of the satellite navigation system (GPS); and a VICS receiver 22 acting as traffic information acquiring means; or a data transceiver 23. The VICS receiver 22 receives road traffic information through FM multi-channels, electric beacons or light beacons, and the data transceiver 23 is exemplified by a portable telephone or personal computer for exchanging the information necessary for navigation with a traffic information center (e.g., ATIS) on demand.

The information memory unit 3 is an external memory for storing the programs and data for navigation and is exemplified by a CD-ROM. The programs stored are a program for processing the route search, a processing program, a program for controlling the display output for the route guidance and the voice output control for the voice guidance, the data necessary therefor, and the display information data necessary for the route guidance and the map display. The stored data consists of the data necessary for the navigation system, such as map data, search data, guide data, map matching data, destination data and registered point data. In addition, the invention can also be applied to a system in which the CD-ROM contains only the data and the central processing unit contains the programs.

The central control unit 4 includes a CPU 40 for executing a variety of arithmetic operations; a flash memory 41 for reading and storing the programs from the CD-ROM of the information memory unit 3; a ROM 42 containing programs (or program readings means) for checking and updating the programs contained in the flash memory 41; a RAM 43 for temporarily latching the searched route guide information, such as the point coordinates of a set destination or a road name code No.; an image memory 44 for storing graphic data to be used for the display; an image processor 45 for receiving the graphic data from the image memory 44 based on the display output control signal from the CPU 40 and thereby to output the processed data to the display; a voice processor 46 for synthesizing and transforming a voice, a phrase, one sentence, a sound and so on, as read out of the information memory unit 3 based on the voice output control signal received from the CPU, into an analog signal and outputting it to the speaker 16; a communication interface 47 for transferring the input/output data; a sensor input interface 48 for receiving the sensor signal of the present position detecting unit 2; and a clock 49 for writing the date and time in an internal diagnosis data file. Here, the route guidance is executed by the screen display and the voice output, which can be selected by the driver. In addition, the external memory unit may contain the aforementioned updating program.

The program according to the invention and other programs for executing navigation may be wholly stored in a CD-ROM or an external memory medium, or they may be partially or wholly stored in the ROM 42.

The data and programs, as stored in the external memory medium, are input as external signals to and processed by the central control unit of the navigation system so that the various navigation functions are realized.

As described above, the navigation system includes the flash memory 41 having a relatively large capacity for reading programs from the CD-ROM of the external memory unit, and the ROM 42 having a small capacity that contains programs (or program reading means) for starting the CD. The actual structure of where programs are maintained and where they are used is a matter of design well within the skill of the ordinary artisan in the computer arts. Thus, only limited examples, as discussed above, are provided. The structure chosen will involve considerations of cost, hardware/space limitations, ergonomics, and other such design factors. The flash memory 41 is the non-volatile memory means for latching the stored information even if the power is turned OFF. For use of a CD, the programs stored in the ROM 42 or the program reading means are initiated to check the programs stored in the flash memory 41 and to read the disk managing information, etc., stored in the CD-ROM of the information memory unit 3. The loading (or updating) operation of the programs is executed by determining that information and the state of the flash memory 41.

FIG. 2 shows an example of the structure of the major data lines stored in the CD-ROM 3 shown in FIG. 1. FIG. 2(A) presents a guide road data file, which contains data necessary for calculating the route, such as the number, length, attribute data, address, size and shape, of each road of an n-number of roads. The road number is set in each direction (outbound or inbound) of each road between branch points. The aforementioned shape data are composed, as shown in FIG. 2(B), of longitudes and latitudes of each of an m-number of nodes for each road as divided in a plurality of nodes (or sections).

The guide data are composed, as shown in FIG. 2(C), of the names of intersections (of branch points), caution point data, road name data, the address and size of the road name data, and the address and size of the destination data.

The destination data are composed, as shown in FIG. 2(D), of the destination road number, the destination name, the address and size of the destination name voice data, the destination direction data and the running guide data. The destination name includes a district name. Moreover, the destination direction data are data including the invalid (i.e., do not use the destination direction data), the unnecessary (i.e., no guidance), the straight, the rightward, the obliquely rightward, the rightward turning direction, the leftward, the obliquely leftward and the leftward turning direction.

The navigation process of the invention will now be described.

Figure 3:
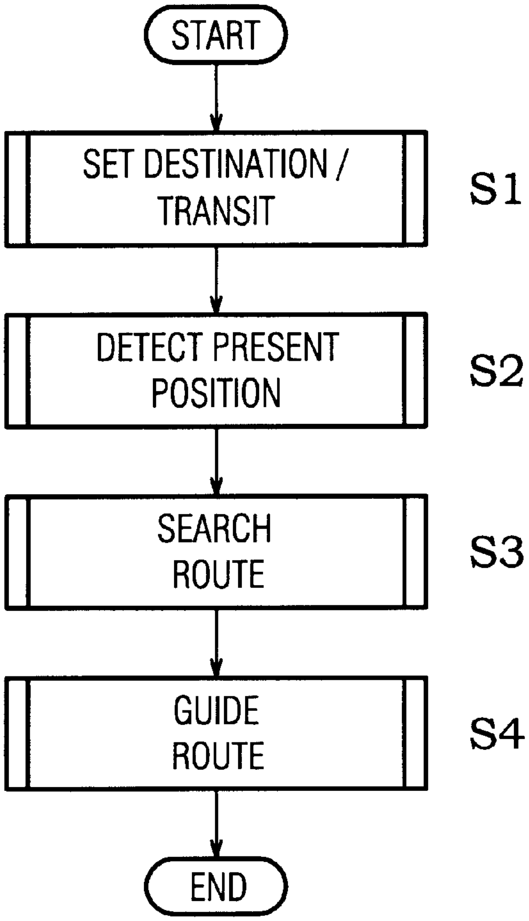
FIG. 3 is a diagram explaining a flowchart of the entire operation navigation system according to the invention.

FIG. 3 is a flowchart of the overall operation of the navigation system according to the invention. The programs stored in the information memory unit 3 are read in the CPU 40 of the central control unit 4 to start route guidance. The destination is set (at Step 1) by using the target name, such as the place name or the facilities name, the telephone number, the address, the registered point, or the road name. Next, the present position is detected (at Step 2) by the present position detecting unit 2 and a peripheral map around the present position and the name of the present position is displayed. The route from the present position to the destination is searched (at Step 3). When the route is determined, the route guidance/display are repeated (at Step 4) until the destination is reached, while tracking the present position as input by the present position detecting unit 2. If a detour setting in input before the destination is reached, a search area is set to search the destination again in the search area, and the route guidance is likewise repeated until the destination is reached.

A data structure for input of the Japanese "kana" syllabary will be described.

Registered point data are stored with the coordinates, name data, the addresses, and the numbers of roads surrounding, the registered points. The registered point name data can also contain many language variations, such as, for example, the Japanese kana syllabary. Thus, the registered points, as listed and searched in Chinese characters of "kanji" or in square forms or "katakana" of kana, may be stored in the Japanese rendering of kanji or katakana or any desired language may be used (as described herein, the symbols of the Japanese language are used). However, the registered point address data contains the locations of the registered points according to the hierarchical relationship of states, cities and towns in the examples. The relationships will depend on the geopolitical area of use.

Figure 5:
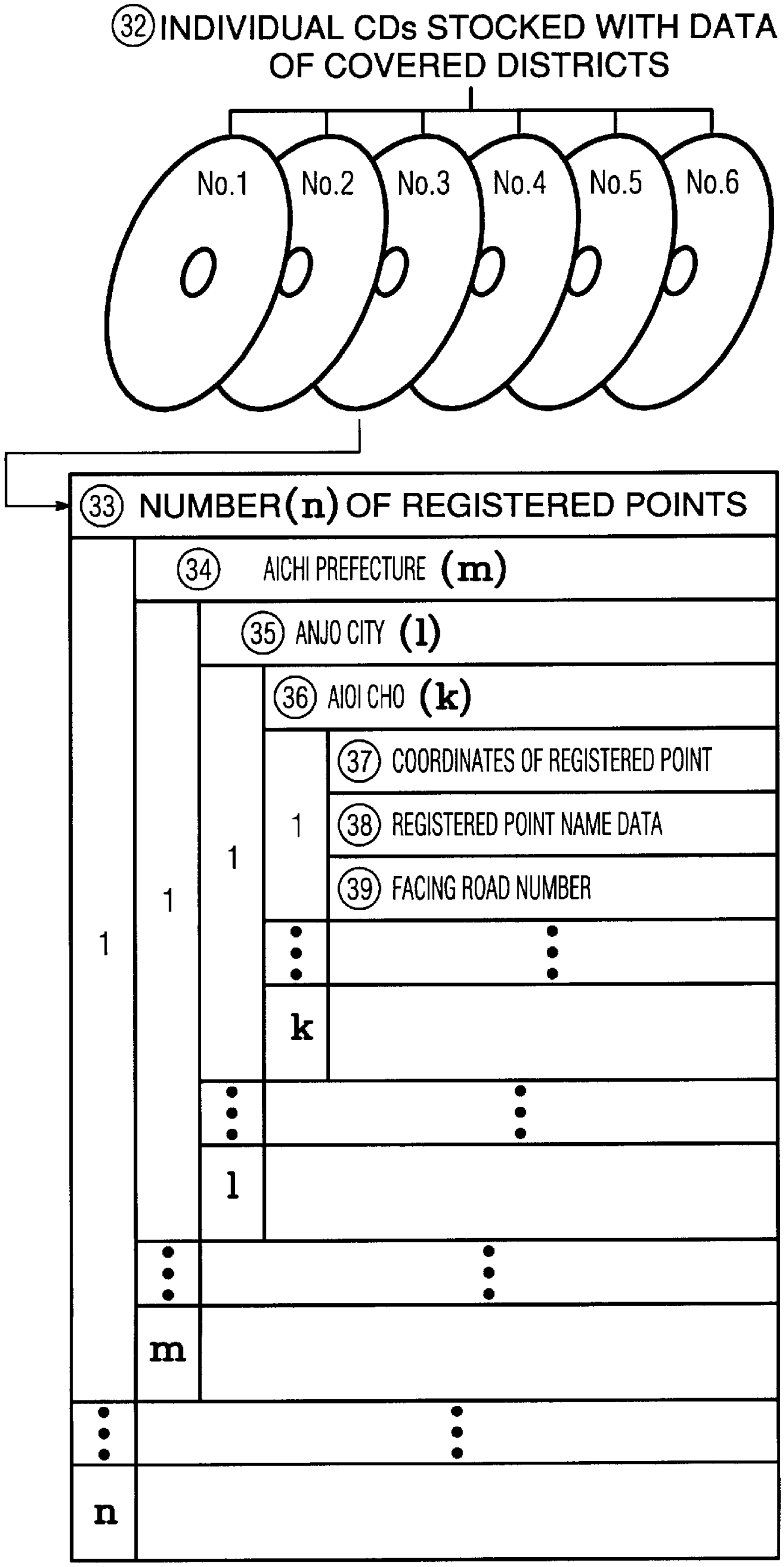
FIG. 5 is a diagram explaining an example of the data structure.

FIG. 5 is a diagram showing another example of a registered point data structure. When the data of the entire country is stored on a CD and input in the kana syllabary, it takes a long time to search the data because they cover the entire country. In this embodiment, the entire country is divided into several districts, such as Tohoku, Kanto, Kansai Districts, etc., the data of which are stored in CDs No. 1 to No. 6 to restrict the districts covered in the search. In this case, all the CDs Nos. 1 to 6 contain the information as to what CD contains the information of the individual metropolis and district. If a district (e.g., Aichi state of Chubu District), is not stored in CD No. 2 and is selected while the CD No. 2 (covering Kanto District, for example) is active, the No. 2 CD contains the CD number (e.g., No. 3), where the selected district is stored and the CD No. 3 is then activated for the search. The content of the CD, for example, No. 3 (i.e., for the Chubu District), hierarchically contains the number of waypoints (or the number N of states), an m-number of cities in Aichi state, an l-number of blocks in Anjo City, and a k-number of waypoints in Aioi Cho.

The invention can be applied to be used with many different languages throughout the world. For example Japanese kana inputting will be described in detail with reference to FIGS. 6 to 8.

As shown in FIG. 5, a plurality of CDs are used to store the data for the divided districts. At the time of the kana inputting, the district to be searched is specified first in order to extract the points contained in the specified district stored on a specific CD.

Figure 6:
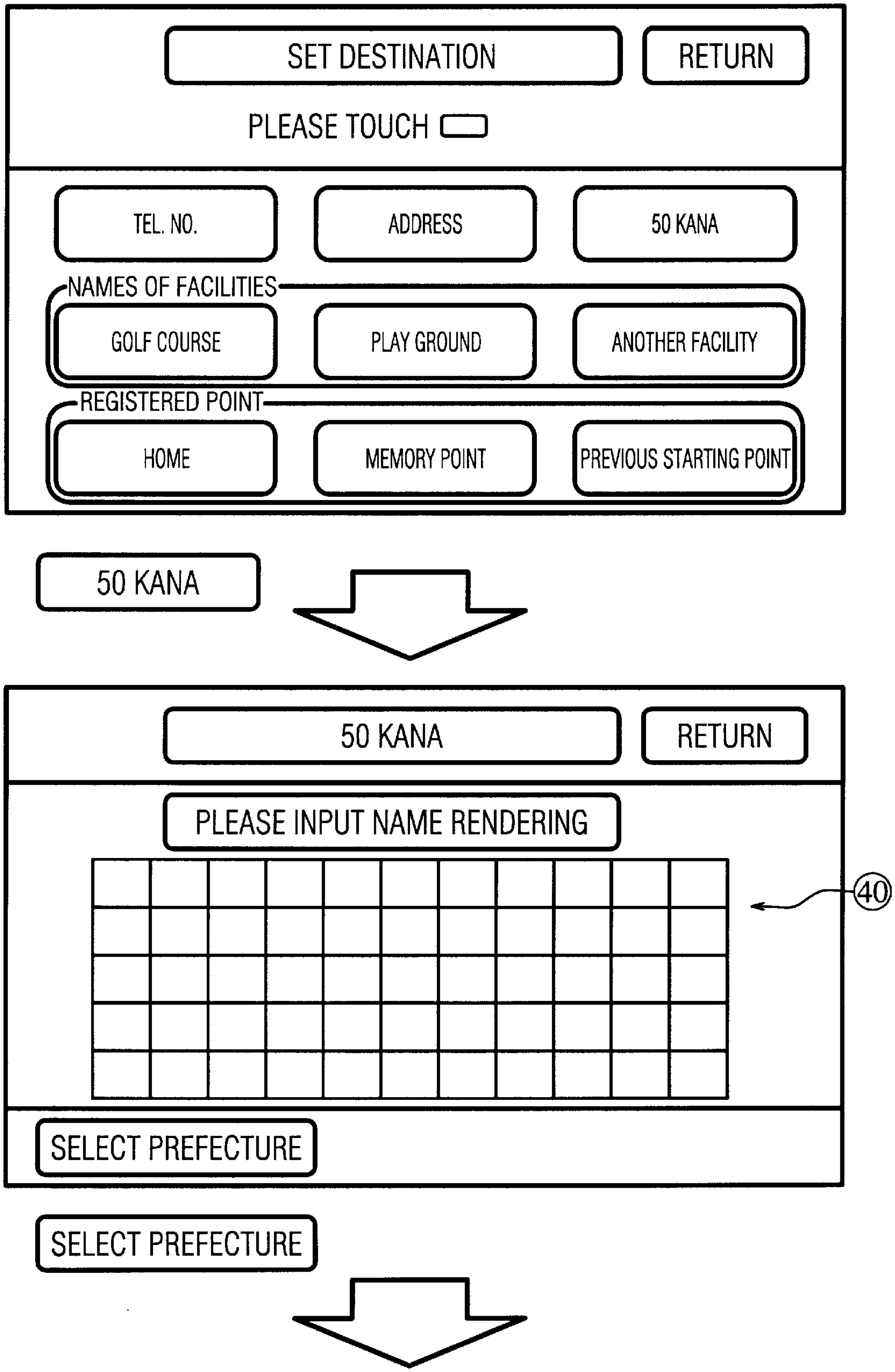
FIG. 6 is a diagram showing a menu screen for setting a destination and a transition from the menu screen to an input screen.

FIG. 6 illustrates a menu screen for setting a destination and shows the transition from the menu screen to the kana inputting screen.

A touch panel screen is used in order that the process corresponding to the selected item or the menu of the subsequent hierarchy is selected and executed. In the menu screen used for setting the destination, the select items, such as the telephone number, the address, the facilities name (e.g., the golf course, the playground, etc.), and the registered point (e.g., the driver's house, the memory point and the previous starting point), are displayed. If the "kana" button is selected, the screen transfers to the kana inputting screen. The kana data to be searched, as described above, are stored separately in the plurality of CDs. Unless specifically designated, a CD is automatically selected which contains the area surrounding the vehicle's present position, as detected by the present position detecting unit of the vehicle. If designated, a CD is selected which contains the designated district.

Figure 7:
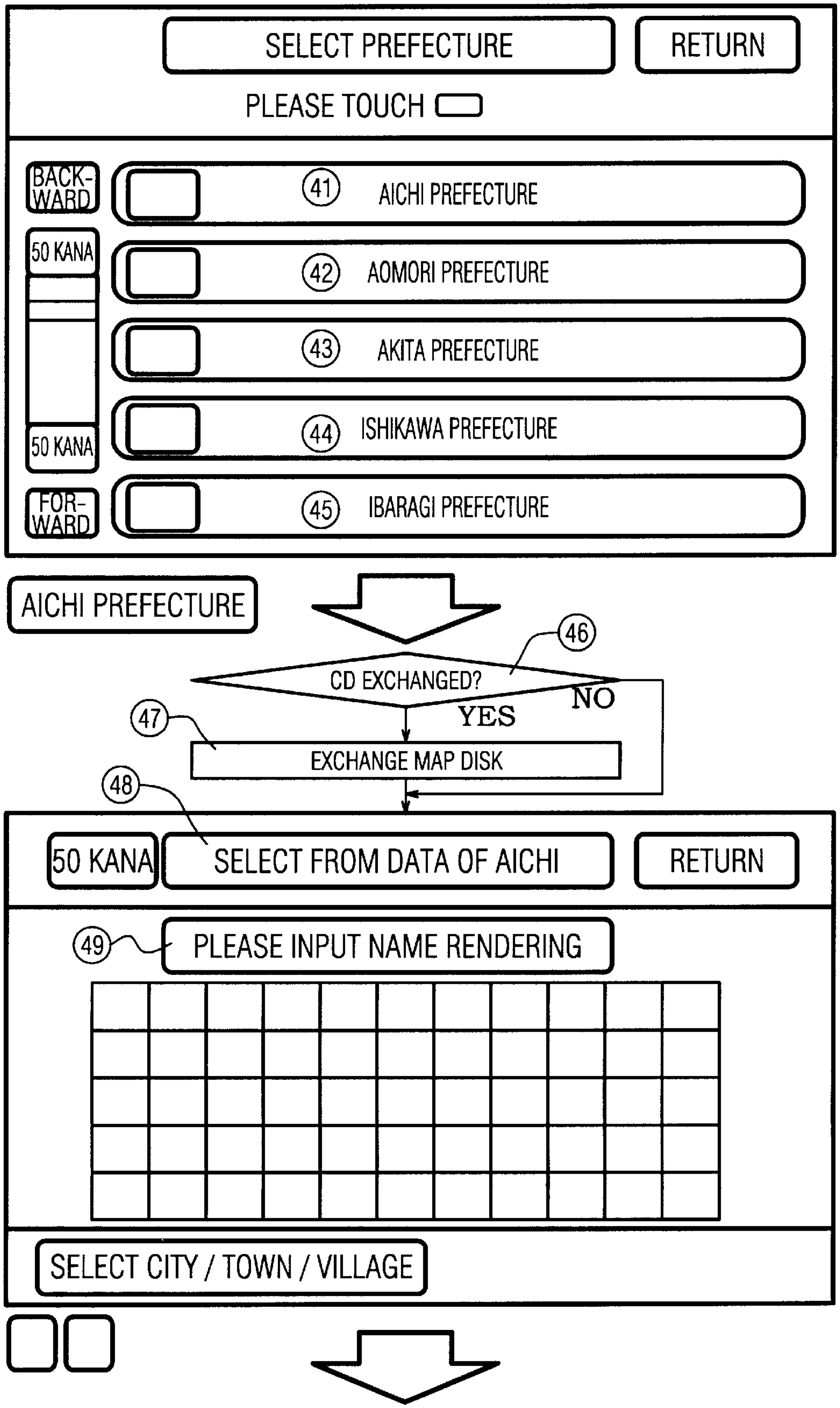
FIG. 7 is a diagram showing a transition from a prefecture selecting screen to the input screen.

In the kana inputting screen, the menu screen is restored if the "Return" key is selected, and the point input is searched in the selected CD if input in kana. When the "Select" state key is touched, the state names are listed in the order of characters, as shown in FIG. 7. When the item "Forward" or "Backward" is touched on the screen, the screen is scrolled forward or backward either by line or screen. For example, if Aichi state is selected but is not stored on the CD being currently selected, the CD is replaced by the CD which contains the Aichi state.

Figure 8:
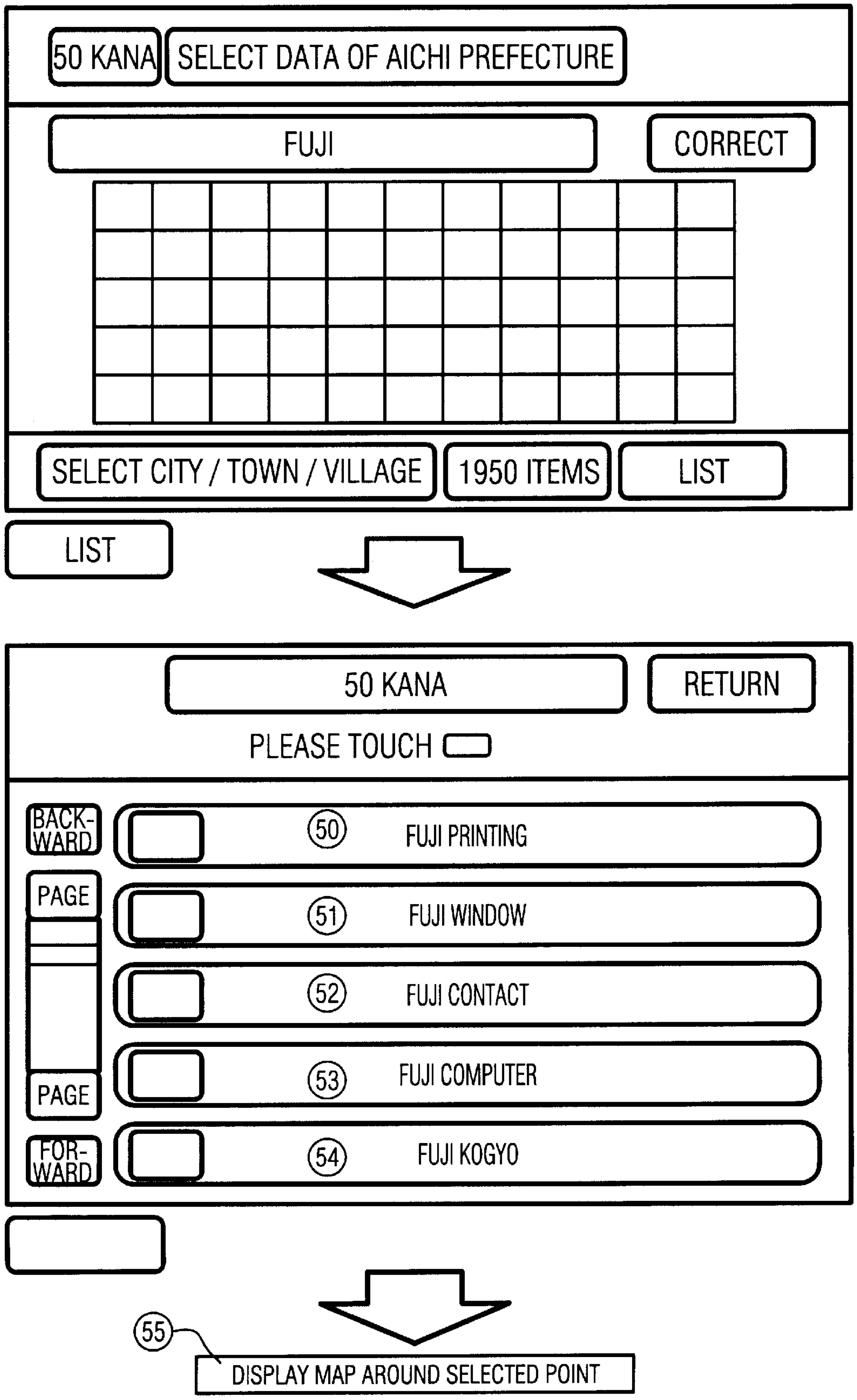
FIG. 8 is a diagram showing a list display.

Once the Aichi state is found on the proper CD, the screen transfers to the kana inputting screen. On this screen, the "Select from Information of Aichi State" key and the "Select City, Town and Village" key in Aichi state are displayed. As shown in FIG. 8, when the first character and the second character are input in this screen, the display shows that the kanas following the characters are limited, and that there are 1,950 items corresponding to registered points.

The "Correction" key is provided for correcting the kana inputs by deleting one kana when touched. When the Correction key is touched in the shown state, a character is deleted. When the "List" key on the screen is then touched, all the registered names beginning with the two characters shown are listed. If the screens are scrolled to find a target name, this name is selected/inputted by touching the keys or by operating the remote control. Then, the registered point coordinates (or location coordinates) of the selected point are read out so that the map is displayed around the coordinates. If the number of the remaining list items is so large that the target name or point is hard to find on the display screen, the number of characters to be input is increased. When the number of the remaining list items is reduced to a small number, the list items may be displayed to select the target name or point.

If the map on the selected point is displayed on the screen, and the "Set" key, although not shown, is displayed and touched, the selected point is then set as the destination or waypoint. Moreover, the route to the set destination or waypoint is searched by the route calculating means, and the route guidance is executed by the route guide means.

The search of the selected point by kana inputting and by district designation will be described with reference to FIGS. 9 to 12.

Figure 9:
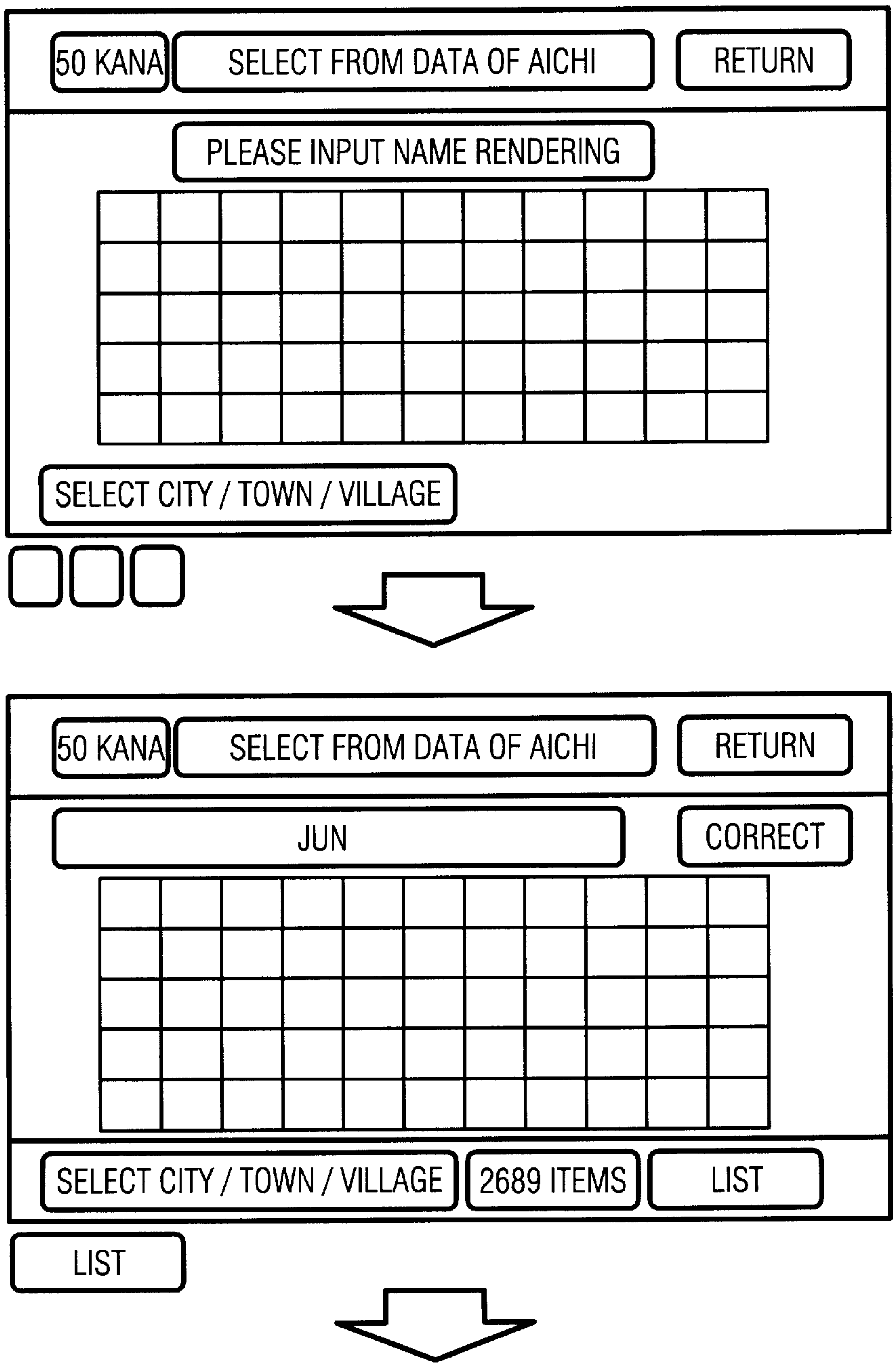
FIG. 9 is a diagram showing a screen to which an input is made.
Figure 10:
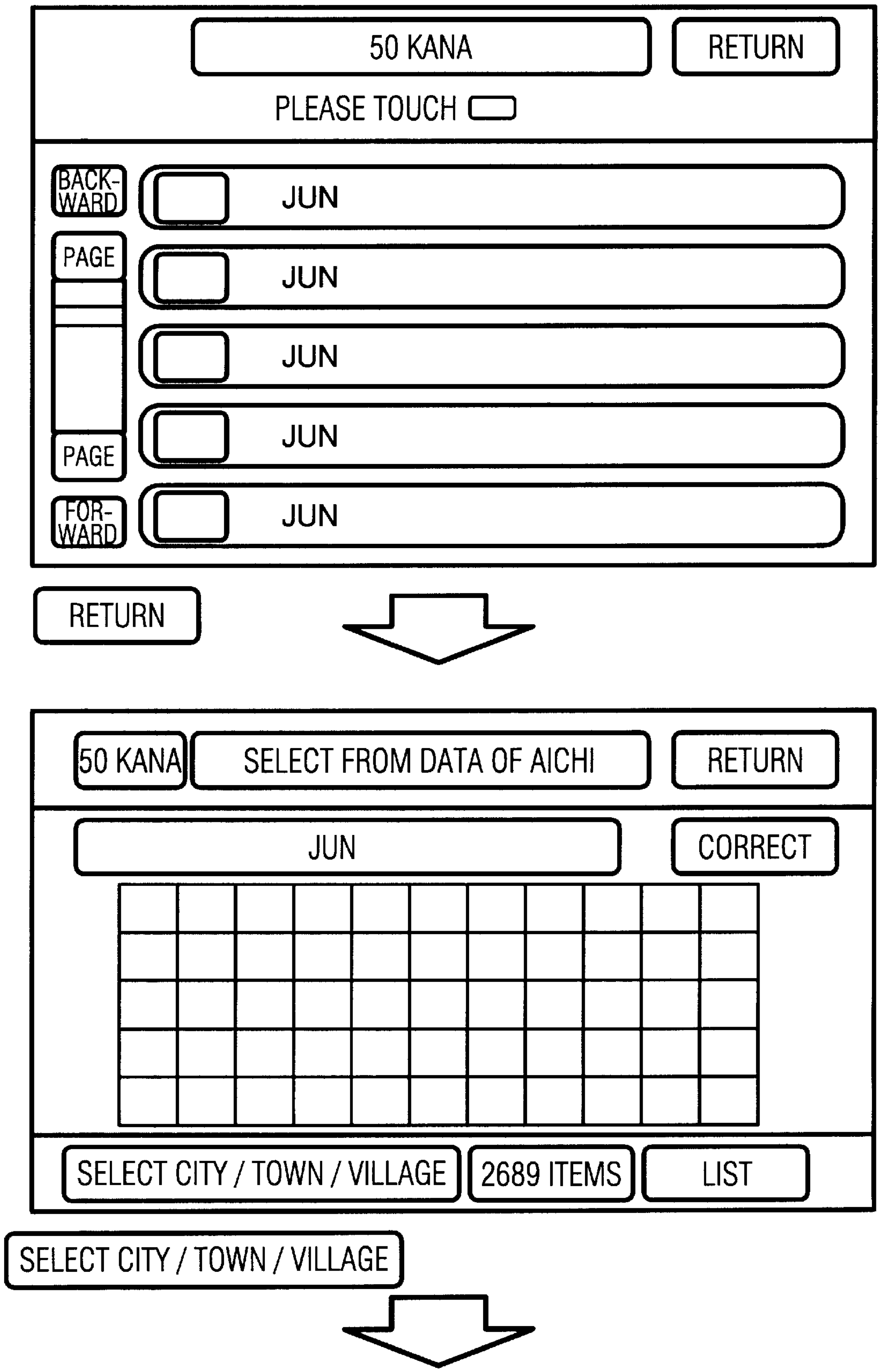
FIG. 10 is a diagram showing the transition from the list display screen to the input screen.
Figure 11:
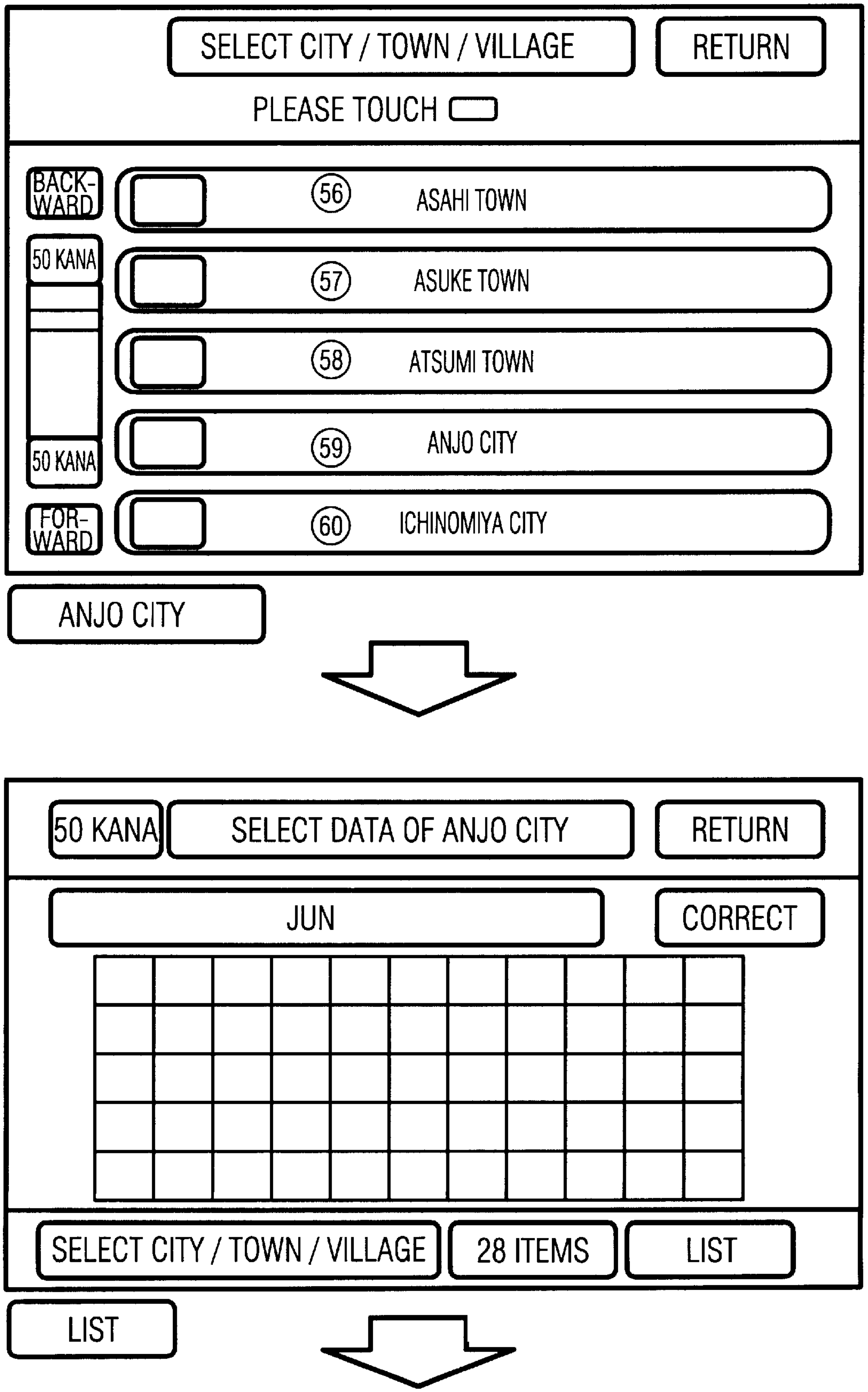
FIG. 11 is a transition diagram from a screen for selecting city, town and village to the input screen.
Figure 12:
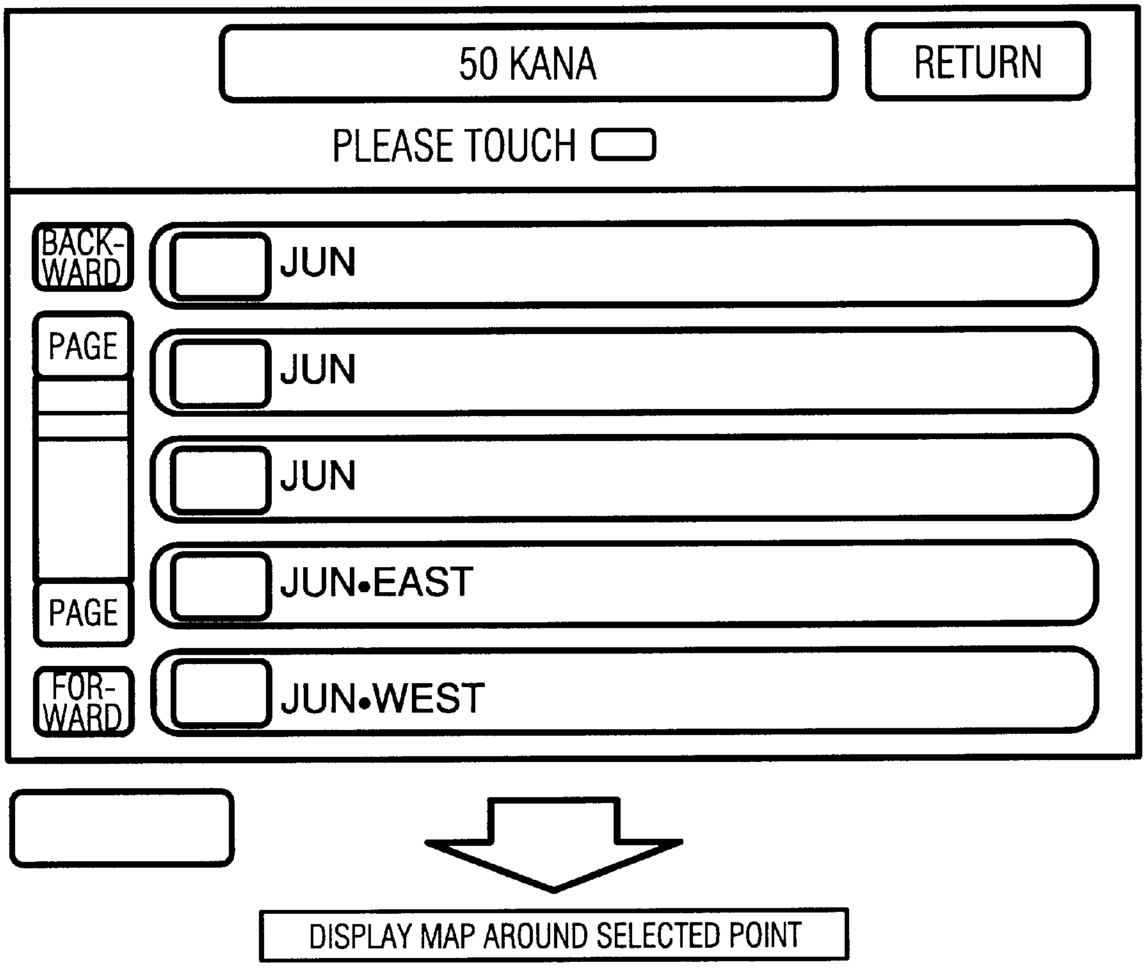
FIG. 12 is a diagram showing a point selection from the list display screen.

FIG. 9 illustrates a screen in which Aichi state is selected by the kana inputting. When the name is input in this kana inputting screen, the succeeding kanas and the remaining 2,689 list items are displayed. When the List key is touched, the syllables having those characters (in the kanas or kanjis) are listed, as shown in FIG. 10. Because the number of the remaining list items is excessively large in this case, the Return key is touched for designating the district and returned again to the kana selecting screen. When the "Select City, Town and Village" key is touched, the names of cities, towns and villages are listed, as shown in FIG. 11. When Anjo City is then selected to designate the area, the number of the remaining list items displayed is reduced to 28. Next, the list key is touched to list the 28 items, as shown in FIG. 12. When the target name is selected from the items, the map around the selected point is displayed.

Figure 13:
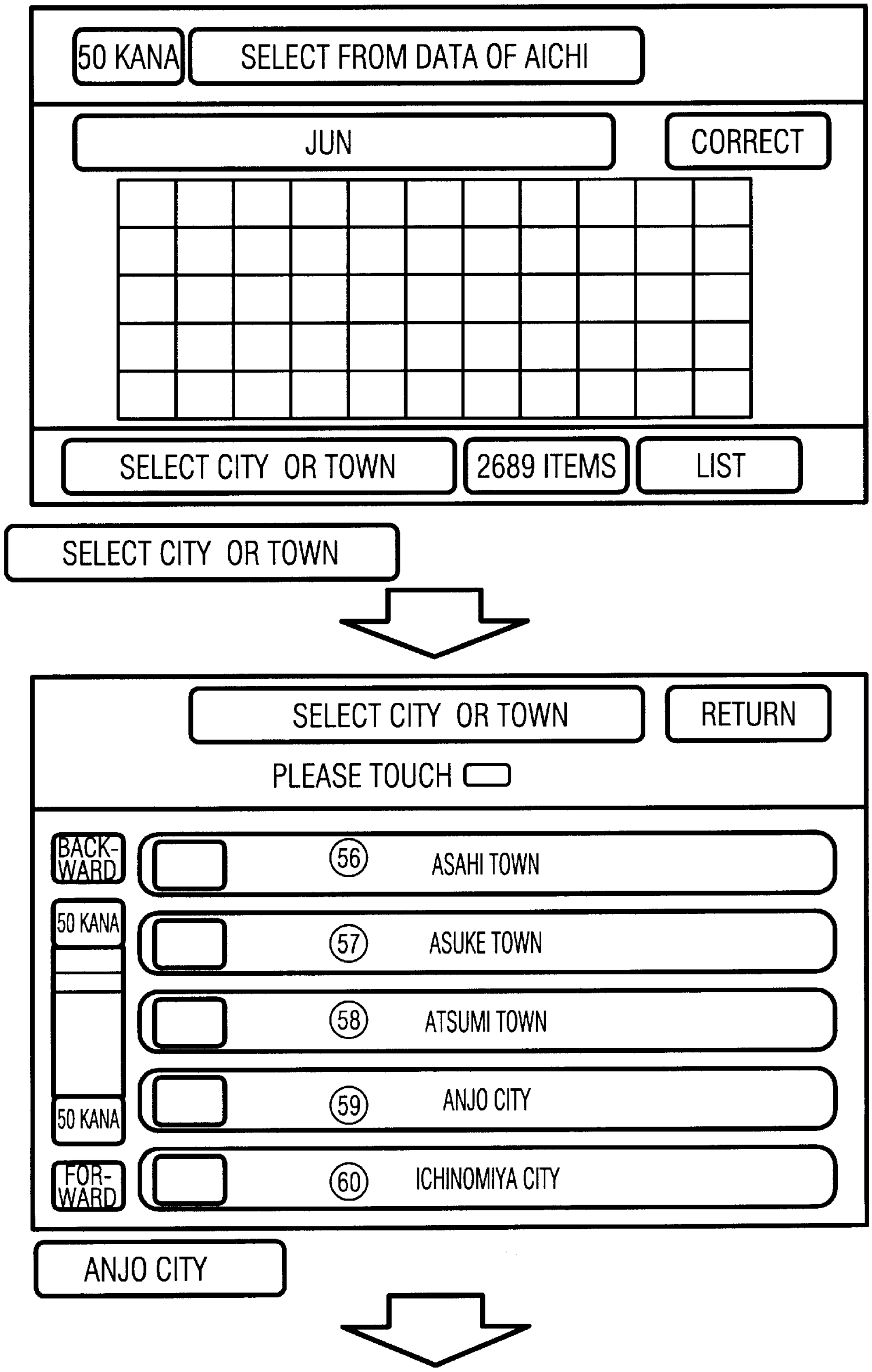
FIG. 13 is a transition diagram from the input screen to the city, town and village selecting screen.
Figure 14:
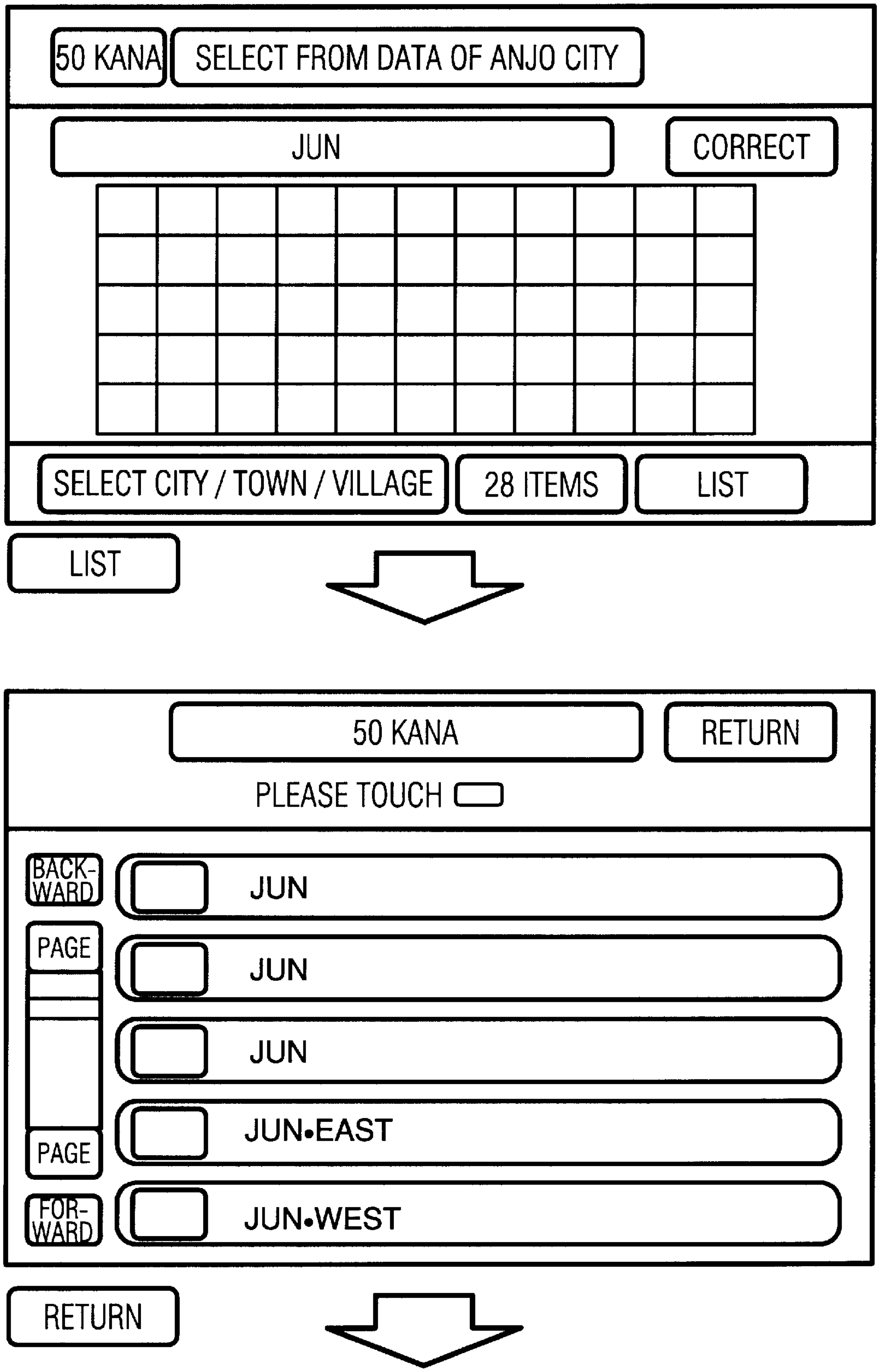
FIG. 14 is a transition diagram from the input screen to the list display screen.
Figure 15:
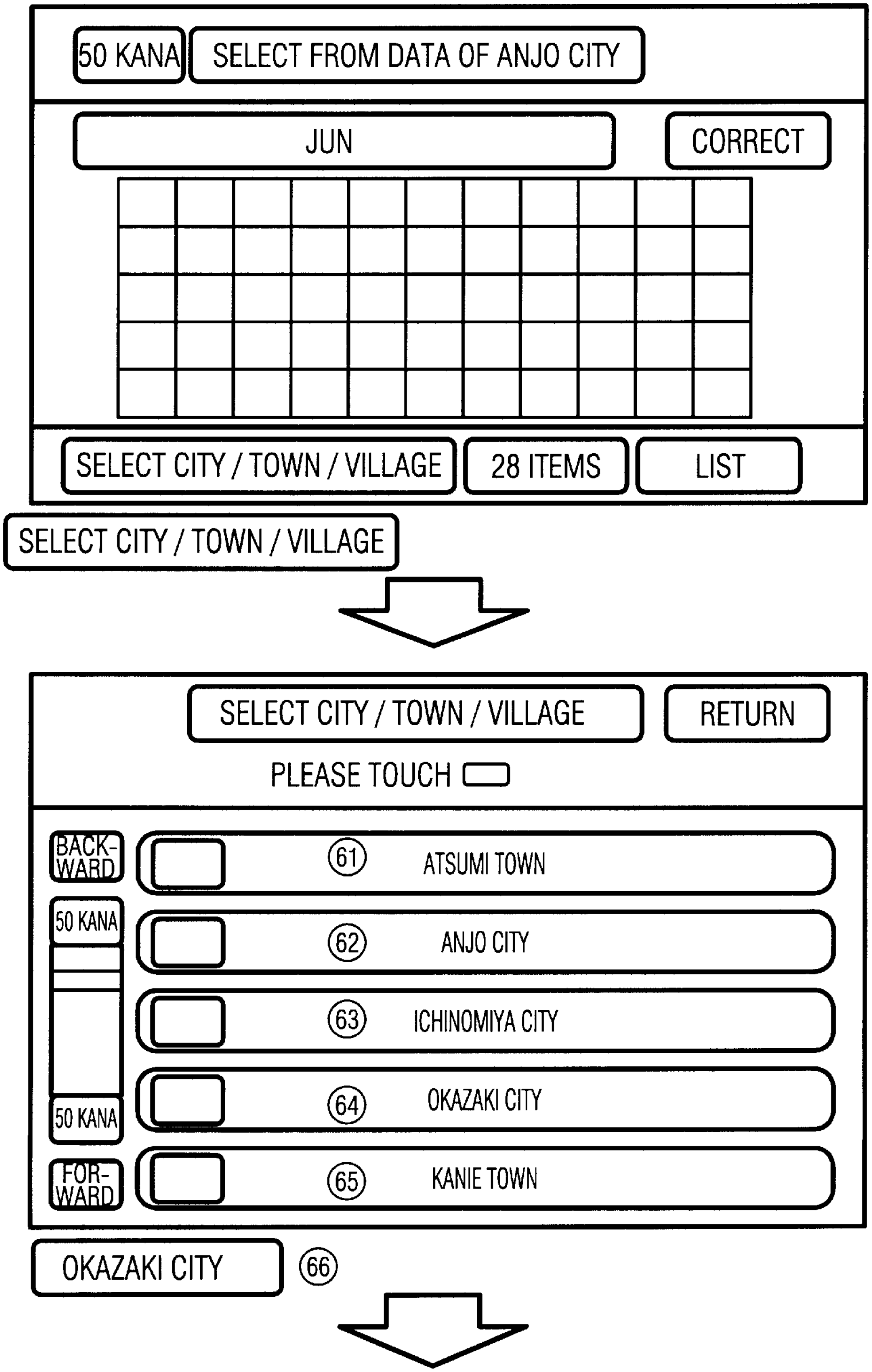
FIG. 15 is a transition diagram from the input screen to the city, town and village selecting screen.
Figure 16:
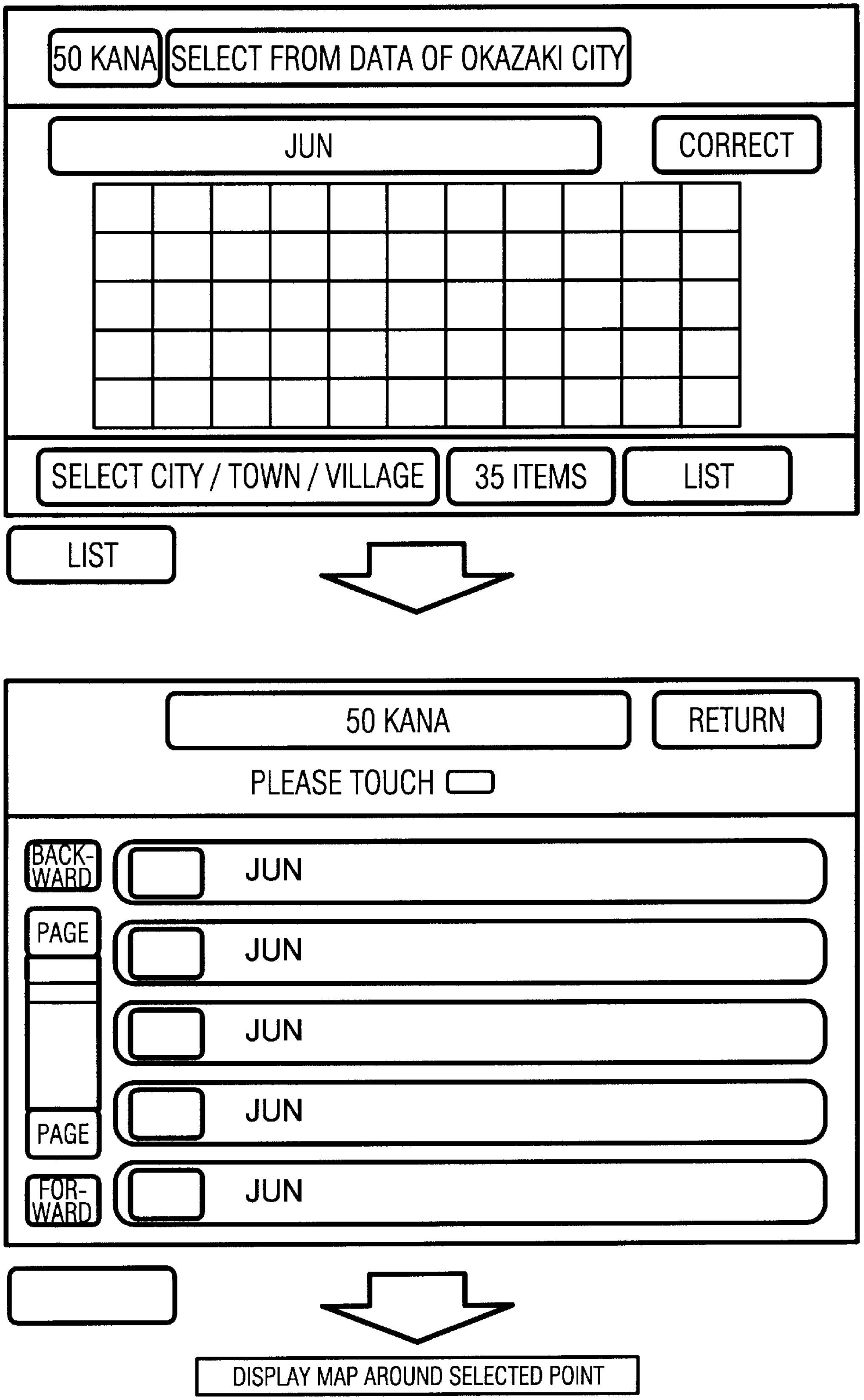
FIG. 16 is a transition diagram from the kana inputting screen to the list display screen.

Incidentally, as shown in FIGS. 13 and 14, the number of the remaining list items having the characters shown is 2,689, and the "Select City, Town and Village" key is touched to select Anjo City so that the remaining listed items are limited to 28. If the target point is not in this list, the "Return" key is touched to restore the kana inputting screen, as shown in FIG. 15, to select Okazaki City, (the city adjacent to Anjo City), for example. The number of the remaining list items is 35, as shown in FIG. 16. If the target is in this list, it is selected to display the map around the selected point.

When the "Select City, Town and Village" key is touched in order to select Anjo City, the input characters are not canceled but left so that the corresponding Kana input is automatically searched when another city, town or village is selected. Thus, the input operation is simplified in that if the user mistakes the city, town or village to be selected, the proper city, town or village can still be found in the course of the input operation.

Figure 17:
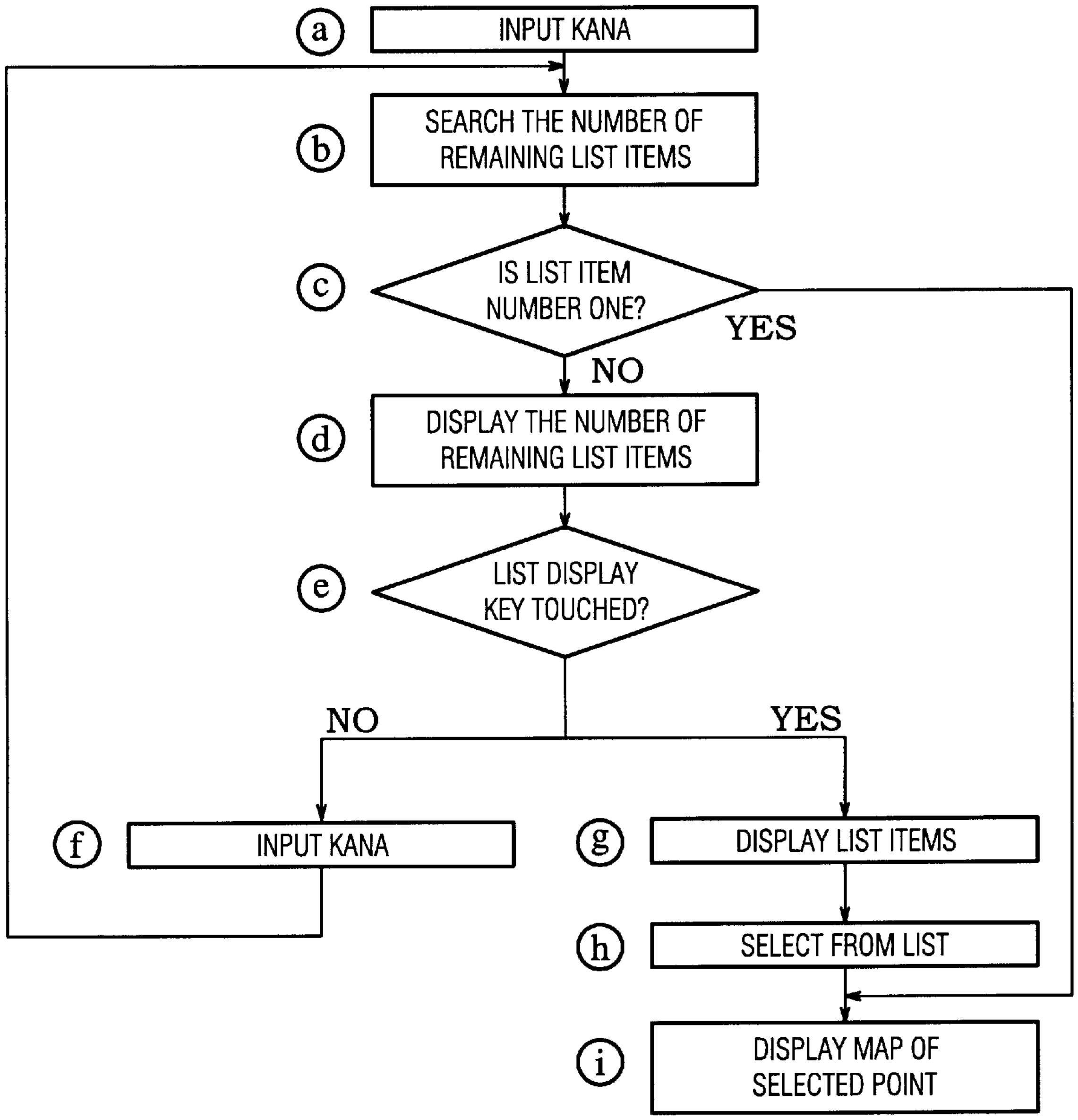
FIG. 17 is a flowchart showing remaining list number display processing.

FIG. 17 shows a list item number displaying routine for kana inputting. When the input is made by kanas in the input screen, the number of the remaining list items is searched for each character input, and is displayed on the screen if the number is more than 1. Then, a decision is made as to whether the list display key has been touched to execute the list display processing or whether to continue the inputting of characters. If the list display key has not been touched, the input is made. If the list display key has been touched, the list display displays all the corresponding names. If the target name is selected from the list, a map of the surroundings of the selected point is displayed. If there is only one number on the list, the map around the selected point is displayed automatically or is displayed by touching the key.

Figure 18:
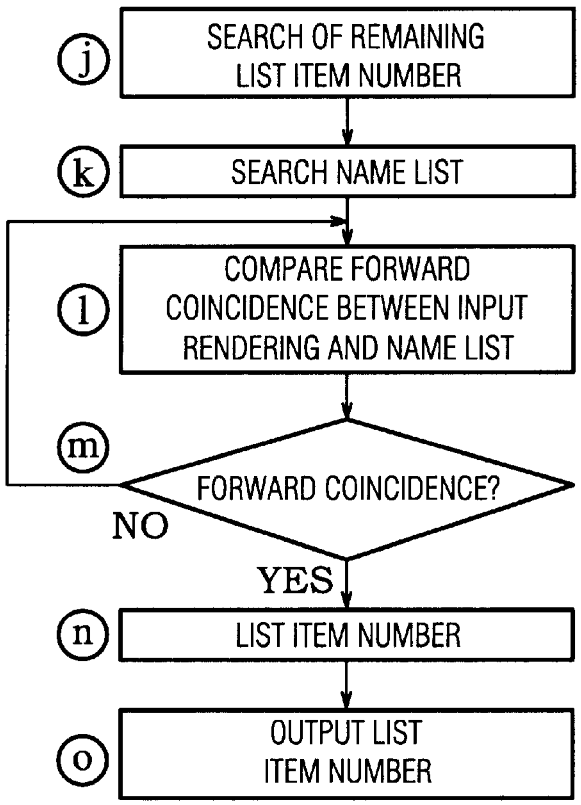
FIG. 18 is flowchart showing processing of remaining list number locations.

FIG. 18 shows a routine for searching the remaining list item number by a match comparison. With the kana input, the list of names is searched to compare the input to a name on the name list. In the comparison, the list item number (L) is incremented by 1, and the process is executed for all data until the search is ended. When all the data are searched, the list item number is output.

Figure 19:
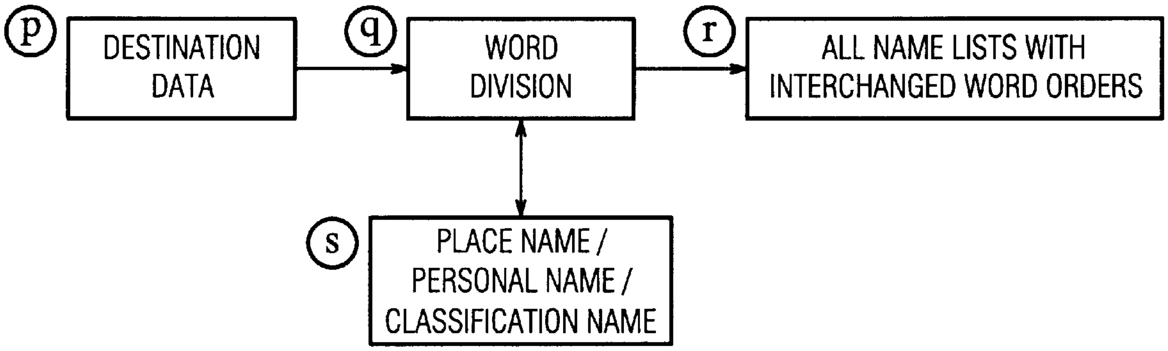
FIG. 19 is a diagram for explaining location processing by word division.

Incidentally, according to the invention, the search can be made not only by comparing by direct match but also by inputting an informal name. As shown in FIG. 19, for example, the names of target data are divided into words and examined as to whether the divided words contain place names, personal names, and classification names (including schools, city offices, stations, parks or hotels). If place names such as Tokyo and Ryogoku are found, for example, the following division is made:

Tokyo Disney Land: Tokyo•Disney Land

Ryogoku Kokugikan: Ryogoku•Kokugikan.

Next, assuming that the divided words can be searched in any order, there is a name list in which the order of words can be interchanged. A plurality of items are stored on CD-ROM as follows:

for Tokyo Disney Land: Tokyo Disney Land
Disney Land Tokyo;

and for Ryogoku Kokugikan: Ryogoku Kokugikan
Kokugikan Ryoguku.

The plurality of items are sorted in the proper order when stored in the CD-ROM. An example of the name list stored on CD-ROM is shown in FIG. 20.

As seen from FIG. 20, "Ryoguku Kokugikan" and "Kokugikan Ryogoku" are stored for the formal name "Ryoguku Kokugikan", and "Tokyo Disney Land" and "Disney Land Tokyo" are stored for the formal name "Tokyo Disney Land". This makes it possible to search "Ryogoku Kokugikan" and "Tokyo Disney Land" even if they are input by the informal names "Kokugikan Ryogoku" and "Disney Land Tokyo". Moreover, the names are stored on CD-ROM in an order so that the searches can be executed at high speed. Incidentally, when the remaining item number is to be displayed at the input time, the number stored in the name list is displayed. Moreover, if the names on the list are stored without any sonant so as to make characters appear identical, for example, the numbers of the characters to be input and selected by the user can be reduced.

If the target names contain place names, personal names and classification names, the name list can be formed by dividing the words so that personal names and classification names are eliminated leaving only a partial name such as "Kokugikan" or "Disney Land", to be compared for matching stored words and the target name data.

Figure 21:
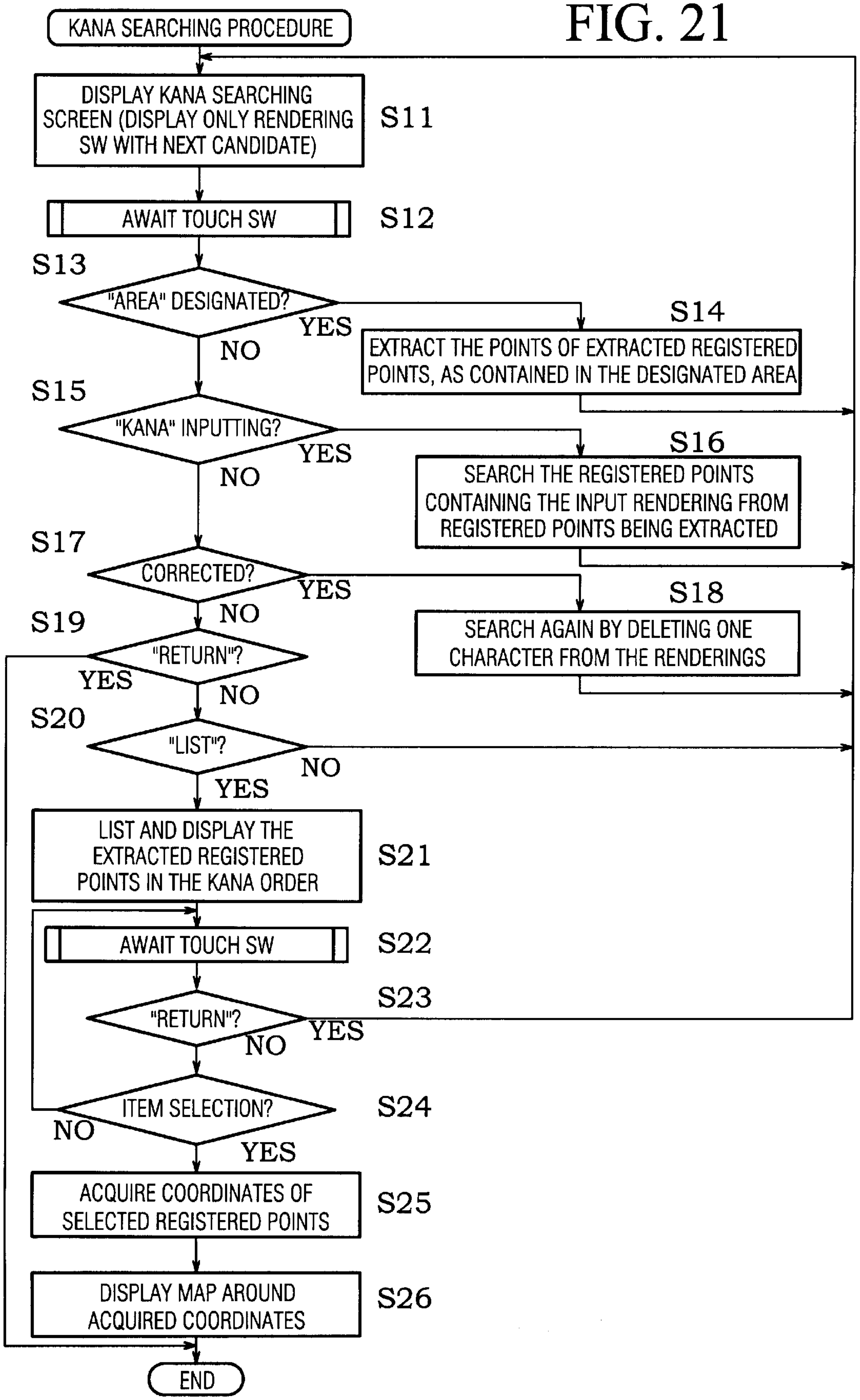
FIG. 21 is a flowchart showing a search processing flow.

FIG. 21 is a flowchart showing the kana searching procedure of the invention. If the kana inputting is selected on the menu screen shown in FIG. 6, the kana searching routine is begun and the kana searching screen is displayed with a message requesting input of a name (at Step 11). At this time, the system selects one CD containing the district to which the present place belongs, and the routine awaits (at Step 12) for the touch switches of the screen to be touched. If the area to be searched is designated, the registered points, which are contained in the designated area, are extracted first (at Steps 13 and 14). If the registered points are contained on a plurality of CDs, and if the area designated is not contained on the CD currently being used, the CD is changed to the correct one. If kana inputting is then made, the registered points containing the input name are searched from the registered points being extracted (at Steps 15 and 16). If a correction is made, the search is made again (at Steps 17 and 18) by deleting one character from the name. At this time, the kana searching screen displays (at Step 11) only the touch switches corresponding to the letter which may appear next, that is, only the character touch switches subsequent to the letters of the registered points, which include the names having been input up to that point. If the "Return" key is touched without selecting an item from the kana searching screen, the routine is ended (at Step 19). If the "List" key is then touched, the extracted registered points are listed and displayed in the kana order to await further operation of the touch keys (at Steps 20 to 22). If the "Return" key is touched in this state, the screen is returned again to the kana searching screen. If the item selection is made, the coordinates of the selected registered points are acquired to display the map around the acquired coordinates (at Steps 23 to 26).

In the present embodiment having the plurality of CDs acting as the memory media and divided for the individual districts, only the contents of a state, city, town or village are extracted in advance if the state, city, town or village are selected. According to another district designating method for searching the registered points, the district need not be designated by the administrative district, but the user may manually designate an area in advance.

For designating the area, for example, a predetermined distance from a center point is manually input (by key, mouse, cursor, etc.) so that the registered points within the predetermined range from the center point can be retrieved. Moreover, a plurality of states, cities, towns or villages can be input in advance to make a search within a certain tolerance. A restrictive condition may be input so that the map being displayed designates an area by a telephone number (e.g., only an area code, or both an area code and local number) or a zip code.

Figure 4:
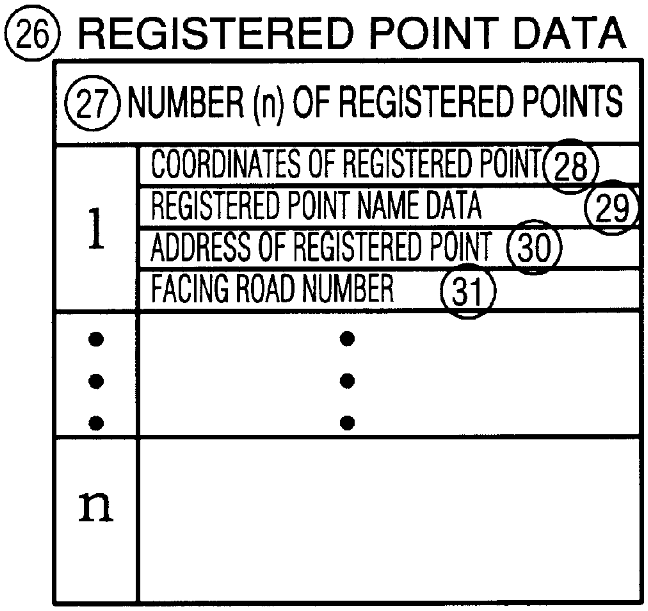
FIG. 4 is a diagram showing a registered point data structure.

If information on a national road is known, the road name may be input. For example, the areas within a predetermined range from the national road may be searched, or the registered point data shown in FIGS. 4 and 5 may contain the road name so that information on the national road No. 1 may be input in advance so that only the areas facing the input road are searched.

Alternatively, the designations of both the areas and the road names may be used, as described above.

It may happen that the area input in advance by the user is ambiguous. For example, the area, although input as belonging to Anjo City, may be actually located in the adjacent Okazaki City. This situation occurs in the following case. When the user remembers the name of a shop which he has visited but cannot remember the exact location, he searches for the shop by making the kana input as if the shop is located in Anjo City, but the shop is actually located in the adjacent Okazaki City. In this case, the search may be extended, even if the user inputs Anjo City, to cover the surrounding cities, towns and villages. If Anjo City is input, for example, the search is extended to the cities, towns and villages adjoining Anjo City. The selection is easier if the list of the searched points is displayed with their individual locations.

In the foregoing embodiment, the individual CDs are completely sorted by the districts. For example, however, a sight-seeing place or the like may not be located in the district in which it belongs, and may be distant from the present position. Also, it may be that the sight-seeing place is located on a CD different from that being actuated. Therefore, these points can be searched by kanas if their names are stored on all the CDs, and may be found no matter what CD might be activated. Since, however, so much information cannot be stored on all the CDs, the "yellow page" data, which are often stored only for a particular district, are contained only in the CD covering the particular district.

Figure 22:
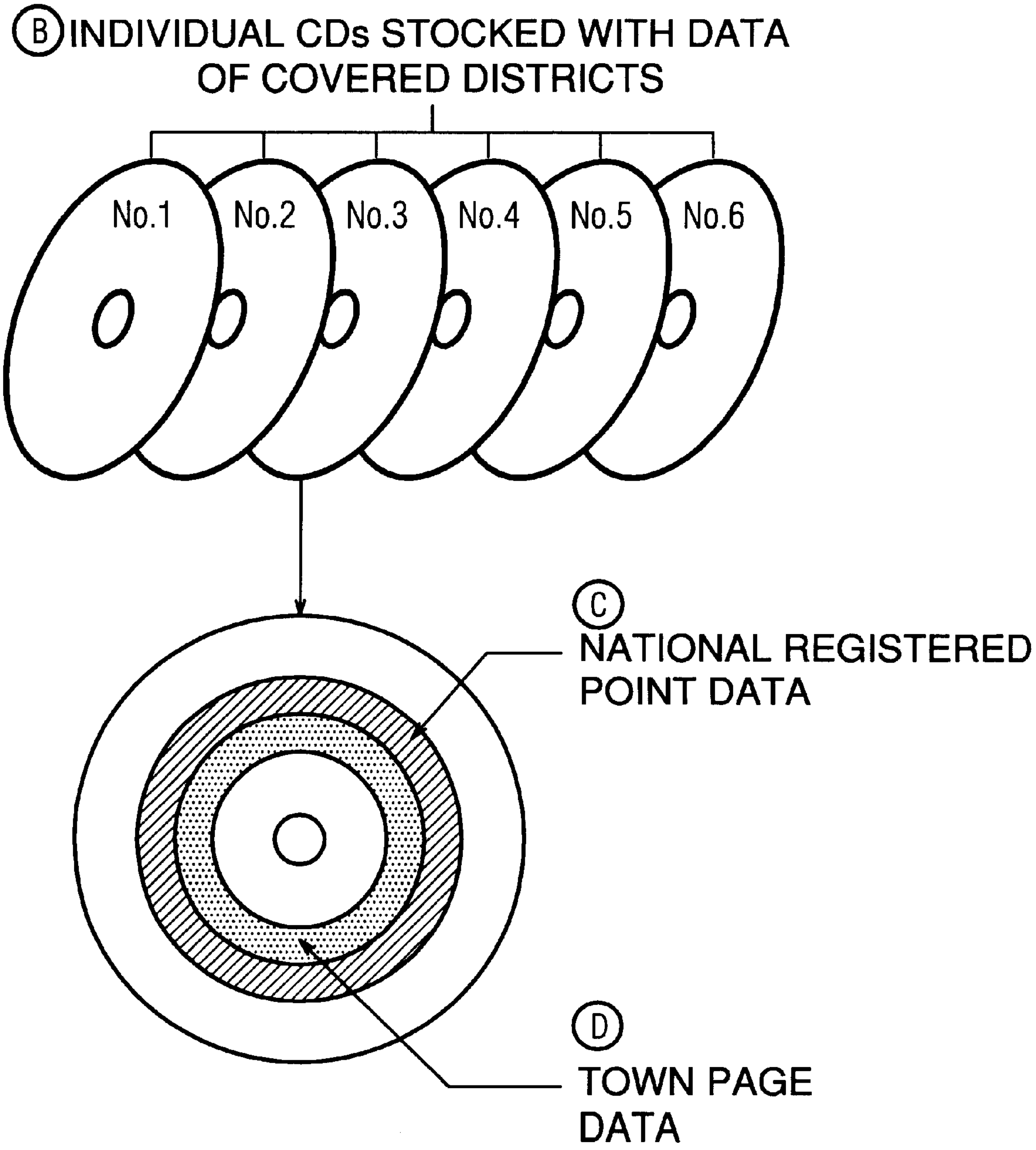
FIG. 22 is a diagram showing an example of a data structure.

FIG. 22 shows how the names of sight-seeing places or the like are commonly stored as the national registered point data on the individual CDs, along with the "yellow page" data, etc., stored for a particular district on each CD. For example, the CD No. 3 contains data concerning the Chubu District, and all of the individual CDs contain information on the national registered point data, such as famous facilities, sight-seeing places and golf courses. The CD No. 3 contains the national registered point data and the "yellow page" data (of shops and enterprises) in the Chubu District.

In short, the registered point data are given a hierarchical structure so that the upper hierarchy information, such as national registered point data, are contained in all the memory media whereas the lower hierarchy information, such as the particular district data, such as the "yellow page" data, are separately stored in the memory media for the individual districts.

In the foregoing embodiment, the registered point data are separated for the districts and stored on a plurality of CDs. However, all data may naturally be contained in a single CD and input by kanas. Moreover, this example has been made for the Japanese kana inputting (or by the Japanese names), but, as previously noted, the characters, such as the English alphabet and other languages, can also be input in series.

According to the invention as has been described, by storing the names of the registered points or the character series of the names and the name of the districts to which the registered points belong, and also by allowing the input of a portion of the character series of the names, the registered points are searched, restricted to and displayed in a list to allow easy selection by the user. Moreover, the targets of a search can be restricted by designating a district in advance to perform a primary extraction from all the targets of the search, and then inputting the name or a portion of the name. As a result, it is possible to reduce the searching steps when searching the point data corresponding to the name or the character series of the name. If a plurality of CDs for the individual districts are used, the common national data and the local data are contained in each CD so that the common national data can be searched by inputting the name or character series of the name despite whatever CD might be currently actuated.

What is claimed is:

1. A vehicular navigation system which enables input of a character series of a registered point in order to search for the registered point, comprising:

information memory means for storing, as registered point data, data on the character series that spells out a name of each registered point and data on a district in which each registered point is located;

input means for inputting at least a portion of the character series for spelling out the name of the registered point and the data for designating a district where the registered point is to be searched;

search means for searching for the registered point, which corresponds to the designated district and at least a portion of the character series input to the input means, from among all the registered points which are stored in the information memory means; and display means for displaying the registered points in a list, wherein the search means searches for the registered point in a district corresponding to a district input to the input means, wherein the district used for searching for the registered point input by the input means is an area designated by the user.

2. A vehicular navigation system which enables input of a character series of a registered point in order to search for the registered point, comprising:

information memory means for storing, as registered point data, data on the character series that spells out a name of each registered point and data on a district in which each registered point is located;

input means for inputting at least a portion of the character series for spelling out the name of the registered point and the data for designating a district where the registered point is to be searched;

search means for searching for the registered point, which corresponds to the designated district and at least a portion of the character series input to the input means, from among all the registered points which are stored in the information memory means; and display means for displaying the registered points in a list, wherein the search means searches for the registered point in a district corresponding to a district input to the input means, wherein the search means searches for the registered point within a predetermined range which is measured from the center of an area designated by a user.

3. A vehicular navigation system which enables input of a character series of a registered point in order to search for the registered point, comprising:

information memory means for storing, as registered point data, data on the character series that spells out a name of each registered point and data on a district in which each registered point is located;

input means for inputting at least a portion of the character series for spelling out the name of the registered point and the data for designating a district where the registered point is to be searched;

search means for searching for the registered point, which corresponds to the designated district and at least a portion of the character series input to the input means, from among all the registered points which are stored in the information memory means; and display means for displaying the registered points in a list, wherein the search means searches for the registered point in a district corresponding to a district input to the input means, wherein the district used in searching for the registered point input to the input means is determined by the area code number of a telephone number.

4. A vehicular navigation system which enables input of a character series of a registered point in order to search for the registered point, comprising:

information memory means for storing, as registered point data, data on the character series that spells out a name of each registered point and data on a district in which each registered point is located;

input means for inputting at least a portion of the character series for spelling out the name of the registered point and the data for designating a district where the registered point is to be searched;

search means for searching for the registered point which corresponds to the designated district and at least a portion of the character series input to the input means, from among all the registered points which are stored in the information memory means; and display means for displaying the registered points in a list, wherein the search means searches for the registered point in a district corresponding to a district input to the input means, wherein the district used in searching for the registered point input to the input means is determined by a mail code.

5. A vehicular navigation system which enables input of a character series of a registered point in order to search for the registered point comprising:

information memory means for storing, as registered point data, data on the character series that spells out a name of each registered point and data on a district in which each registered point is located;

input means for inputting at least a portion of the character series for spelling out the name of the registered point and the data for designating a district where the registered point is to be searched;

search means for searching for the registered point, which corresponds to the designated district and at least a portion of the character series input to the input means, from among all the registered points which are stored in the information memory means; and display means for displaying the registered points in a list, wherein the search means searches for the registered point in a district corresponding to a district input to the input means, wherein the district used in searching for the registered point input to the input means is determined by a road name.

6. The vehicular navigation system according to claim 5, wherein said search means searches for the registered points within a predetermined range from an inputted road.

7. The vehicular navigation system according to claim 5, wherein the search means searches for the registered points facing the input road.

8. The vehicular navigation system according to claim 7, wherein the information memory means stores position coordinate data where each registered point is located, and wherein the display means displays a map on the basis of the position coordinates of the registered point by reading the position coordinates when one of the registered points displayed in the list is selected.

9. The vehicular navigation system according to claim 1, further comprising:

present position detecting means for detecting a present position of a vehicle; and route guide means for providing route guidance on the basis of the present position detected and a destination or a waypoint position coordinates of a registered point which is stored in said memory means.

10. A vehicular navigation system which enables input of a character series of a registered point in order to search for the registered point, comprising:

information memory means for storing, as registered point data, data on the character series that spells out a name of each registered point and data on a district in which each registered point is located;

input means for inputting at least a portion of the character series for spelling out the name of the registered point and the data for designating a district where the registered point is to be searched;

search means for searching for the registered point, which corresponds to the designated district and at least a portion of the character series input to the input means, from among all the registered points which are stored in the information memory means; and display means for displaying the registered points in a list, wherein the search means searches for the registered point in a district corresponding to a district input to the input means, wherein the search means searches for the registered point within an area range including the inputted district and the surrounding districts thereof.

11. The vehicular navigation system according to claim 10, wherein the information memory means stores the registered point data in a plurality of memory media in different district hierarchies, and wherein the search means selects one memory media to be searched on the basis of the district input by the input means.

12. The vehicular navigation system according to claim 10, wherein the information memory means has a hierarchical structure for the registered point data so that the information of the upper hierarchy and the information of the lower hierarchy are stored separately in the memory media.

13. The vehicular navigation system according to claim 10, wherein the district used in searching for the registered point input by the input means is an administrative district.

14. The vehicular navigation system according to claim 10, wherein the display means displays searched registered points with their individual locations on a list of the registered points.

* * * * *